US009754453B2

(12) United States Patent
O'Hagan

(10) Patent No.: US 9,754,453 B2
(45) Date of Patent: Sep. 5, 2017

(54) SYSTEM AND METHOD FOR ENHANCED SPORTS POOL RAFFLE

(71) Applicant: Sean O'Hagan, Saskatoon (CA)

(72) Inventor: Sean O'Hagan, Saskatoon (CA)

( * ) Notice: Subject to any disclaimer, the term of this patent is extended or adjusted under 35 U.S.C. 154(b) by 158 days.

(21) Appl. No.: 14/703,102

(22) Filed: May 4, 2015

(65) Prior Publication Data

US 2015/0325085 A1 Nov. 12, 2015

(30) Foreign Application Priority Data

May 6, 2014 (CA) .................................... 2851463

(51) Int. Cl.
*G06F 17/00* (2006.01)
*G07F 17/32* (2006.01)
*A63F 9/24* (2006.01)

(52) U.S. Cl.
CPC ............ *G07F 17/3272* (2013.01); *A63F 9/24* (2013.01); *G07F 17/32* (2013.01); *G07F 17/3286* (2013.01)

(58) Field of Classification Search
USPC ...................................................... 463/16–25
See application file for complete search history.

(56) References Cited

U.S. PATENT DOCUMENTS

| | | | | |
|---|---|---|---|---|
| 2009/0318213 A1* | 12/2009 | Wright | G07F 17/32 | 463/17 |
| 2010/0121896 A1* | 5/2010 | Oram | H04L 9/0662 | 708/250 |
| 2012/0034964 A1* | 2/2012 | Luciano, Jr. | G07F 17/32 | 463/17 |
| 2015/0310693 A1* | 10/2015 | Feuer | G07F 7/025 | 221/1 |

* cited by examiner

*Primary Examiner* — Ronald Laneau
(74) *Attorney, Agent, or Firm* — King & Schickli, PLLC

(57) ABSTRACT

A system for an electronic raffle based on the final score of at least one sporting event. Tickets are sold which are assigned at least one unique outcome of the at least one sporting event. The winning ticket is dictated by the matching of the scores on the ticket with the actual scores of the sporting event. If a winning ticket is not sold, or there is an anomaly in that a score or scores is outside the range of scores that are in the pool, a winner is chosen from a random drawing of the tickets sold.

32 Claims, 14 Drawing Sheets

FIGURE 1:

Team A

| Team B | 6 | 4 | 0 | 3 | 8 | 7 | 1 | 9 | 2 | 5 |
|---|---|---|---|---|---|---|---|---|---|---|
| 2 | Paul | Tom | Mary | Steve | Leroy | Joe | Ed | Mike | Kate | Rick |
| 8 | Alan | Pete | Chris | Bill | Jim | Larry | Bob | Don | Chloe | Ed |
| 1 | Leroy | Paul | Bill | Ed | Mary | Kate | Al | Jean | Dave | Alex |
| 7 | Brett | Casey | Brad | Jake | Alice | Spud | Roy | Bob | Lisa | Mike |
| 9 | Eddie | Mike | Alan | Leroy | Kate | Dave | Paul | Rose | Ann | Jim |
| 0 | Chloe | Sluggo | Lisa | Fred | Peter | Chris | Lee | Adam | Rob | Cliff |
| 3 | Larry | Ben | Jerry | Ike | Kyle | Phil | Bob | Ron | Lee | Ray |
| 5 | Butch | Spike | Kenny | Robin | Kim | Hank | Don | Lisa | Ed | Lee |
| 4 | June | April | Bob | Butch | Kim | Al | Tim | Tom | Steve | Brad |
| 6 | Steve | Larry | Greg | A.C. | Karen | Frank | Gus | Ray | Leroy | Tim |

FIGURE 2:

Team A

| | | 0 | 1 | 2 | 3 | 4 | 5 | 6 | 7 | 8 | 9 | 10 | ... | 69 |
|---|---|---|---|---|---|---|---|---|---|---|---|---|---|---|
| | 0 | 0-0 | 0-1 | 0-2 | 0-3 | 0-4 | 0-5 | 0-6 | 0-7 | 0-8 | 0-9 | 0-10 | ... | 0-69 |
| | 1 | 1-0 | 1-1 | 1-2 | 1-3 | 1-4 | 1-5 | 1-6 | 1-7 | 1-8 | 1-9 | 1-10 | ... | 1-69 |
| | 2 | 2-0 | 2-1 | 2-2 | 2-3 | 2-4 | 2-5 | 2-6 | 2-7 | 2-8 | 2-9 | 2-10 | ... | 2-69 |
| Team B | 3 | 3-0 | 3-1 | 3-2 | 3-3 | 3-4 | 3-5 | 3-6 | 3-7 | 3-8 | 3-9 | 3-10 | ... | 3-69 |
| | 4 | 4-0 | 4-1 | 4-2 | 4-3 | 4-4 | 4-5 | 4-6 | 4-7 | 4-8 | 4-9 | 4-10 | ... | 4-69 |
| | 5 | 5-0 | 5-1 | 5-2 | 5-3 | 5-4 | 5-5 | 5-6 | 5-7 | 5-8 | 5-9 | 5-10 | ... | 5-69 |
| | 6 | 6-0 | 6-1 | 6-2 | 6-3 | 6-4 | 6-5 | 6-6 | 6-7 | 6-8 | 6-9 | 6-10 | ... | 6-69 |
| | 7 | 7-0 | 7-1 | 7-2 | 7-3 | 7-4 | 7-5 | 7-6 | 7-7 | 7-8 | 7-9 | 7-10 | ... | 7-69 |
| | 8 | 8-0 | 8-1 | 8-2 | 8-3 | 8-4 | 8-5 | 8-6 | 8-7 | 8-8 | 8-9 | 8-10 | ... | 8-69 |
| | 9 | 9-0 | 9-1 | 9-2 | 9-3 | 9-4 | 9-5 | 9-6 | 9-7 | 9-8 | 9-9 | 9-10 | ... | 9-69 |
| | 10 | 10-0 | 10-1 | 10-2 | 10-3 | 10-4 | 10-5 | 10-6 | 10-7 | 10-8 | 10-9 | 10-10 | ... | 10-69 |
| | ... | ... | ... | ... | ... | ... | ... | ... | ... | ... | ... | ... | ... | ... |
| | 69 | 69-0 | 69-1 | 69-2 | 69-3 | 69-4 | 69-5 | 69-6 | 69-7 | 69-8 | 69-9 | 69-10 | ... | 69-69 |

FIGURE 3:

Team A

| Team B | 0 | 1 | 2 | 3 | 4 | 5 | 6 | 7 | 8 | 9 | 10 | 11 |
|---|---|---|---|---|---|---|---|---|---|---|---|---|
| 0 | 0-0 | 0-1 | 0-2 | 0-3 | 0-4 | 0-5 | 0-6 | 0-7 | 0-8 | 0-9 | 0-10 | 0-11 |
| 1 | 1-0 | 1-1 | 1-2 | 1-3 | 1-4 | 1-5 | 1-6 | 1-7 | 1-8 | 1-9 | 1-10 | 1-11 |
| 2 | 2-0 | 2-1 | 2-2 | 2-3 | 2-4 | 2-5 | 2-6 | 2-7 | 2-8 | 2-9 | 2-10 | 2-11 |
| 3 | 3-0 | 3-1 | 3-2 | 3-3 | 3-4 | 3-5 | 3-6 | 3-7 | 3-8 | 3-9 | 3-10 | 3-11 |
| 4 | 4-0 | 4-1 | 4-2 | 4-3 | 4-4 | 4-5 | 4-6 | 4-7 | 4-8 | 4-9 | 4-10 | 4-11 |
| 5 | 5-0 | 5-1 | 5-2 | 5-3 | 5-4 | 5-5 | 5-6 | 5-7 | 5-8 | 5-9 | 5-10 | 5-11 |
| 6 | 6-0 | 6-1 | 6-2 | 6-3 | 6-4 | 6-5 | 6-6 | 6-7 | 6-8 | 6-9 | 6-10 | 6-11 |
| 7 | 7-0 | 7-1 | 7-2 | 7-3 | 7-4 | 7-5 | 7-6 | 7-7 | 7-8 | 7-9 | 7-10 | 7-11 |
| 8 | 8-0 | 8-1 | 8-2 | 8-3 | 8-4 | 8-5 | 8-6 | 8-7 | 8-8 | 8-9 | 8-10 | 8-11 |
| 9 | 9-0 | 9-1 | 9-2 | 9-3 | 9-4 | 9-5 | 9-6 | 9-7 | 9-8 | 9-9 | 9-10 | 9-11 |
| 10 | 10-0 | 10-1 | 10-2 | 10-3 | 10-4 | 10-5 | 10-6 | 10-7 | 10-8 | 10-9 | 10-10 | 10-11 |
| 11 | 11-0 | 11-1 | 11-2 | 11-3 | 11-4 | 11-5 | 11-6 | 11-7 | 11-8 | 11-9 | 11-10 | 11-11 |

FIGURE 4:

Team A

| Team B | 0 | 1 | 2 | 3 | 4 | 5 | 6 | 7 | 8 | 9 | 10 | 11 |
|---|---|---|---|---|---|---|---|---|---|---|---|---|
| 0 | 0-0 | 0-1 | 0-2 | 0-3 | 0-4 | 0-5 | 0-6 | 0-7 | 0-8 | 0-9 | 0-10 | 0-11 |
| 1 | 1-0 | 1-1 | 1-2 | 1-3 | 1-4 | 1-5 | 1-6 | 1-7 | 1-8 | 1-9 | 1-10 | 1-11 |
| 2 | 2-0 | 2-1 | 2-2 | 2-3 | 2-4 | 2-5 | 2-6 | 2-7 | 2-8 | 2-9 | 2-10 | 2-11 |
| 3 | 3-0 | 3-1 | 3-2 | 3-3 | 3-4 | 3-5 | 3-6 | 3-7 | 3-8 | 3-9 | 3-10 | 3-11 |
| 4 | 4-0 | 4-1 | 4-2 | 4-3 | 4-4 | 4-5 | 4-6 | 4-7 | 4-8 | 4-9 | 4-10 | 4-11 |
| 5 | 5-0 | 5-1 | 5-2 | 5-3 | 5-4 | 5-5 | 5-6 | 5-7 | 5-8 | 5-9 | 5-10 | 5-11 |
| 6 | 6-0 | 6-1 | 6-2 | 6-3 | 6-4 | 6-5 | 6-6 | 6-7 | 6-8 | 6-9 | 6-10 | 6-11 |
| 7 | 7-0 | 7-1 | 7-2 | 7-3 | 7-4 | 7-5 | 7-6 | 7-7 | 7-8 | 7-9 | 7-10 | 7-11 |
| 8 | 8-0 | 8-1 | 8-2 | 8-3 | 8-4 | 8-5 | 8-6 | 8-7 | 8-8 | 8-9 | 8-10 | 8-11 |
| 9 | 9-0 | 9-1 | 9-2 | 9-3 | 9-4 | 9-5 | 9-6 | 9-7 | 9-8 | 9-9 | 9-10 | 9-11 |
| 10 | 10-0 | 10-1 | 10-2 | 10-3 | 10-4 | 10-5 | 10-6 | 10-7 | 10-8 | 10-9 | 10-10 | 10-11 |
| 11 | 11-0 | 11-1 | 11-2 | 11-3 | 11-4 | 11-5 | 11-6 | 11-7 | 11-8 | 11-9 | 11-10 | 11-11 |

FIGURE 5:

Team A

Team B

| | 0 | 1 | 2 | 3 | 4 | 5 | 6 | 7 | 8 | 9 | 10 | ... | 69 |
|---|---|---|---|---|---|---|---|---|---|---|---|---|---|
| 0 | 0-0 | 0-1 | 0-2 | 0-3 | 0-4 | 0-5 | 0-6 | 0-7 | 0-8 | 0-9 | 0-10 | ... | 0-69 |
| 1 | 1-0 | 1-1 | 1-2 | 1-3 | 1-4 | 1-5 | 1-6 | 1-7 | 1-8 | 1-9 | 1-10 | ... | 1-69 |
| 2 | 2-0 | 2-1 | 2-2 | 2-3 | 2-4 | 2-5 | 2-6 | 2-7 | 2-8 | 2-9 | 2-10 | ... | 2-69 |
| 3 | 3-0 | 3-1 | 3-2 | 3-3 | 3-4 | 3-5 | 3-6 | 3-7 | 3-8 | 3-9 | 3-10 | ... | 3-69 |
| 4 | 4-0 | 4-1 | 4-2 | 4-3 | 4-4 | 4-5 | 4-6 | 4-7 | 4-8 | 4-9 | 4-10 | ... | 4-69 |
| 5 | 5-0 | 5-1 | 5-2 | 5-3 | 5-4 | 5-5 | 5-6 | 5-7 | 5-8 | 5-9 | 5-10 | ... | 5-69 |
| 6 | 6-0 | 6-1 | 6-2 | 6-3 | 6-4 | 6-5 | 6-6 | 6-7 | 6-8 | 6-9 | 6-10 | ... | 6-69 |
| 7 | 7-0 | 7-1 | 7-2 | 7-3 | 7-4 | 7-5 | 7-6 | 7-7 | 7-8 | 7-9 | 7-10 | ... | 7-69 |
| 8 | 8-0 | 8-1 | 8-2 | 8-3 | 8-4 | 8-5 | 8-6 | 8-7 | 8-8 | 8-9 | 8-10 | ... | 8-69 |
| 9 | 9-0 | 9-1 | 9-2 | 9-3 | 9-4 | 9-5 | 9-6 | 9-7 | 9-8 | 9-9 | 9-10 | ... | 9-69 |
| 10 | 10-0 | 10-1 | 10-2 | 10-3 | 10-4 | 10-5 | 10-6 | 10-7 | 10-8 | 10-9 | 10-10 | ... | 10-69 |
| ... | ... | ... | ... | ... | ... | ... | ... | ... | ... | ... | ... | | ... |
| 69 | 69-0 | 69-1 | 69-2 | 69-3 | 69-4 | 69-5 | 69-6 | 69-7 | 69-8 | 69-9 | 69-10 | ... | 69-69 |

FIGURE 6:

Team A

Team B

| | 0 | 1 | 2 | 3 | 4 | 5 | 6 | 7 | 8 | 9 | 10 | 11 |
|---|---|---|---|---|---|---|---|---|---|---|---|---|
| 0 | 0-0 | 0-1 | 0-2 | 0-3 | 0-4 | 0-5 | 0-6 | 0-7 | 0-8 | 0-9 | 0-10 | 0-11 |
| 1 | 1-0 | 1-1 | 1-2 | 1-3 | 1-4 | 1-5 | 1-6 | 1-7 | 1-8 | 1-9 | 1-10 | 1-11 |
| 2 | 2-0 | 2-1 | 2-2 | 2-3 | 2-4 | 2-5 | 2-6 | 2-7 | 2-8 | 2-9 | 2-10 | 2-11 |
| 3 | 3-0 | 3-1 | 3-2 | 3-3 | 3-4 | 3-5 | 3-6 | 3-7 | 3-8 | 3-9 | 3-10 | 3-11 |
| 4 | 4-0 | 4-1 | 4-2 | 4-3 | 4-4 | 4-5 | 4-6 | 4-7 | 4-8 | 4-9 | 4-10 | 4-11 |
| 5 | 5-0 | 5-1 | 5-2 | 5-3 | 5-4 | 5-5 | 5-6 | 5-7 | 5-8 | 5-9 | 5-10 | 5-11 |
| 6 | 6-0 | 6-1 | 6-2 | 6-3 | 6-4 | 6-5 | 6-6 | 6-7 | 6-8 | 6-9 | 6-10 | 6-11 |
| 7 | 7-0 | 7-1 | 7-2 | 7-3 | 7-4 | 7-5 | 7-6 | 7-7 | 7-8 | 7-9 | 7-10 | 7-11 |
| 8 | 8-0 | 8-1 | 8-2 | 8-3 | 8-4 | 8-5 | 8-6 | 8-7 | 8-8 | 8-9 | 8-10 | 8-11 |
| 9 | 9-0 | 9-1 | 9-2 | 9-3 | 9-4 | 9-5 | 9-6 | 9-7 | 9-8 | 9-9 | 9-10 | 9-11 |
| 10 | 10-0 | 10-1 | 10-2 | 10-3 | 10-4 | 10-5 | 10-6 | 10-7 | 10-8 | 10-9 | 10-10 | 10-11 |
| 11 | 11-0 | 11-1 | 11-2 | 11-3 | 11-4 | 11-5 | 11-6 | 11-7 | 11-8 | 11-9 | 11-10 | 11-11 |

Team A

Team B

| | 0 | 1 | 2 | 3 | 4 | 5 | 6 | 7 | 8 | 9 | 10 | 11 |
|---|---|---|---|---|---|---|---|---|---|---|---|---|
| 0 | 0-0 | 0-1 | 0-2 | 0-3 | 0-4 | 0-5 | 0-6 | 0-7 | 0-8 | 0-9 | 0-10 | 0-11 |
| 1 | 1-0 | 1-1 | 1-2 | 1-3 | 1-4 | 1-5 | 1-6 | 1-7 | 1-8 | 1-9 | 1-10 | 1-11 |
| 2 | 2-0 | 2-1 | 2-2 | 2-3 | 2-4 | 2-5 | 2-6 | 2-7 | 2-8 | 2-9 | 2-10 | 2-11 |
| 3 | 3-0 | 3-1 | 3-2 | 3-3 | 3-4 | 3-5 | 3-6 | 3-7 | 3-8 | 3-9 | 3-10 | 3-11 |
| 4 | 4-0 | 4-1 | 4-2 | 4-3 | 4-4 | 4-5 | 4-6 | 4-7 | 4-8 | 4-9 | 4-10 | 4-11 |
| 5 | 5-0 | 5-1 | 5-2 | 5-3 | 5-4 | 5-5 | 5-6 | 5-7 | 5-8 | 5-9 | 5-10 | 5-11 |
| 6 | 6-0 | 6-1 | 6-2 | 6-3 | 6-4 | 6-5 | 6-6 | 6-7 | 6-8 | 6-9 | 6-10 | 6-11 |
| 7 | 7-0 | 7-1 | 7-2 | 7-3 | 7-4 | 7-5 | 7-6 | 7-7 | 7-8 | 7-9 | 7-10 | 7-11 |
| 8 | 8-0 | 8-1 | 8-2 | 8-3 | 8-4 | 8-5 | 8-6 | 8-7 | 8-8 | 8-9 | 8-10 | 8-11 |
| 9 | 9-0 | 9-1 | 9-2 | 9-3 | 9-4 | 9-5 | 9-6 | 9-7 | 9-8 | 9-9 | 9-10 | 9-11 |
| 10 | 10-0 | 10-1 | 10-2 | 10-3 | 10-4 | 10-5 | 10-6 | 10-7 | 10-8 | 10-9 | 10-10 | 10-11 |
| 11 | 11-0 | 11-1 | 11-2 | 11-3 | 11-4 | 11-5 | 11-6 | 11-7 | 11-8 | 11-9 | 11-10 | 11-11 |

low scores,Team A wins
High scores, Team A wins
Ties
High scores, Team B wins
Low scores,Team B wins

FIGURE 8:
Start
8-1: Populate outcome dataset 5
8-2: Prepopulate ticket database 3 with ticket records 40
8-3 Open/continue raffle sales window
8-4: Sell sports pool raffle ticket
Yes
8-5: Capture purchasor identity particulars
8-6: Assign purchasor identity particulars to unsold prepopulated ticket record
8-7: Save updated ticket record to database 3
No
No
8-8: Sales window completed?
Yes
8-9: Determine winning event outcome(s)
8-10: Is winning event outcome sold?
No
8-12: Conduct random draw
8-13: Award prize to randomly selected winner
Yes
8-11: Award prize to holder of winning event outcome

SYSTEM AND METHOD FOR ENHANCED SPORTS POOL RAFFLE

A system for an electronic raffle based on the final score of at least one sporting event. Tickets are sold which are assigned at least one unique outcome of the at least one sporting event. The winning ticket is dictated by the matching of the scores on the ticket with the actual scores of the sporting event. If a winning ticket is not sold, or there is an anomaly in that a score or scores is outside the range of scores that are in the pool, a winner is chosen from a random drawing of the tickets sold.

The disclosure of Canadian Patent Application, Ser. No. 2851463, filed May 6, 2014, is incorporated herein by reference.

This invention is in the field of sports pool raffles and electronic systems for the vending of raffles, and more specifically the vending, verification and redemption of a sports pool raffle which provides static or percentage of revenue based prizes and guarantees a winner.

BACKGROUND

Lotteries and raffles are gaming concepts that are used in many contexts, to offer games of chance in certain circumstances as well as to provide profit opportunities or fundraising for the sponsors of such raffles or draws and the like. In the Canadian context, people have been legally betting on sports for decades but are only permitted to make parlay bets (wagering on the outcome of 3 or more events). Recent changes permit wagering on the outcome of single sporting events.

Betting on a single sporting event is considered a fairer bet as it provides a knowledgeable sports fan with a better opportunity to win their bet. This means if you want to bet on the outcome of the Super Bowl you are not required to also pick the outcome of an NHL hockey game or European football match. It should be noted these wagers are considered games of skill, as opposed to receiving random scores as a raffle ticket.

Office pools have become a popular pastime for friends and co-workers to bet on various sporting activities. They are generally parlay bets as well, as most sports do not lend themselves well to betting on a single outcome game on a large scale. A home version of betting on a single outcome game can be built from a paper solution to alleviate some of the problems inherent with printing all the possible scores. A paper based sports pool for a single two team sporting match consists of creating a matrix of possible scores for each team, each representing a unique outcome for the game, and then effectively individuals choose one or more squares in the matrix on which they will be the pool participant. This is often referred to as a matrix method. Although this type of sports pool is easiest to sell, not a lot of money can be raised as there are few available permutations—for example in a ten by ten matrix only 100 permutations exist. It is not intended for an audience of any size.

An alternative to the matrix method of holding a sports pool is to print out all the possible scores, seal them in envelopes so the purchaser cannot know the scores that he/has purchased. Although this works, it is problematic selling all the tickets to a mass audience and if all the tickets are not sold then there may not be a winner.

Canada, the US and other parts of the world have enacted legislation permitting charitable raffles. These raffles although a form of gambling have been deemed to be in the public good and are considered to be gaming more so than gambling. To utilize the outcome of a sporting event for raffle purposes is possible. Rather than choosing the outcome of the sporting event, where skill is involved, a random assignment of final scores can be given on a ticket. This would be considered to be under the umbrella of a lottery scheme and not a raffle as a raffle has a certain winner. Lotteries do not require winners. In a typical lottery, players buy tickets with a series of characters or numbers from authorized vendors at fixed prices. If there is no winner, the jackpot carries to the next lottery draw.

While a lottery does not need to have a certain winner, a raffle needs to have a winner. The need to guarantee the outcome of there being a winner for the raffle has been a limitation in the prior art concepts of paper based or electronically facilitated raffles related to sporting events—since the sports pool may not sell all the tickets or the final score may be outside the range of the pooled numbers so there would be no winner. The present invention modifies the sports pool to ensure there is a winner and thus falls under the category of raffle not lottery.

As such in summary from the perspective of the background and technical landscape, the limitations of the current sports pool lotteries are evident:

a) The sports pool lottery in its current form should not legally be run by charities as it is a lottery and not a raffle. A raffle requires a definite winner. A winner is not present if all the tickets are not sold and the final score is one of the unsold tickets or the final score falls outside the range of what was thought as reasonable scores b) In addition considerable risk may be inherent in this type of lottery as a pre-determined prize has been fixed based on the sales of all tickets and not all the tickets may be sold, yet the winning ticket has been sold. Although unlikely, if only one ticket was sold and it was the winning ticket the charity has a lot of risk;

c) The risk is magnified by paper solutions to the sports pool. The ability to reach a mass audience to sell all the tickets necessary is difficult to physically achieve;

d) Players can be left unhappy if they receive scores that are extremely unlikely or not even close to the real game. They may also be unhappy if they have received scores that only have their team losing.

In light of the availability of venue based raffle systems and infrastructure—for example the hardware and software systems used for the sales of bearer raffles in sporting venues and the like (most often in the form of "50-50" draws and the like), a system which would allow for the fulfillment and sales of an electronically facilitated sports pool raffle would provide additional revenue opportunities and uses for that existing infrastructure. As well, the prevalence of internet access would make it desirable to be able to offer sales of a legislatively compliant and commercially desirable sports pool type raffle through a website system.

In order to overcome the limitations in the prior art the present invention provides an improved system and method for the conduct and administration of a sports pool raffle, using an electronic fulfillment process.

SUMMARY OF THE INVENTION

The present invention provides an improved system and method for the conduct and administration of a sport pool raffle. By electronically facilitating a sports pool raffle, the commercial utility of the sports pool raffle as a fundraising or profit mechanism, when used in accordance with local regulation, is maximized and risk to the sponsoring organization or presenter is mitigated or minimized in terms of the need to sell all of the tickets or available event outcomes in a particular pool as the size of the pool is increased. Other prior problems inherent with traditional paper-based systems including accounting and administration risks and difficulties, which make mass participation difficult, are minimized.

The method of the present invention is a method of conducting an electronically facilitated sports pool raffle in respect of at least one sporting event having a winning event outcome. A sports pool raffle conducted in accordance with the present invention might be conducted with respect to a single sporting event such as a single game or the like between two teams, or in other circumstances given the enhanced utility of the method of the present invention, a single sports pool can also reasonably easily be configured, sold and executed in respect of a plurality of sporting events, each of which has its own winning event outcome or even based upon which it is desired to provide the ability to purchase pool participation in the outcome of a series of events for example. The details of the combinations of events and outcomes which it is believed can effectively be serviced by the method of the present invention are detailed in further detail below.

The first step in the method of electronic sports pool raffle facilitation of the present invention involves providing a ticketing server which hosts a ticket database. The ticket database would comprise a plurality of ticket records, each of which ticket records corresponds to a sports pool ticket sold in the raffle. Each ticket record would include at a minimum it is thought a unique ticket identifier, purchaser identity details, and associated details of at least one potential event outcome of the at least one sporting event assigned to the ticket. Basically a ticket being sold would require the capture of purchaser identity details at a minimum, and a ticket record would then be generated for the ticket database which contained those purchaser identity details along with the necessary ticket identifier information and the associated details of at least one potential outcome which was purchased by the ticket purchaser with respect to their ticket.

In addition to the ticket database, the server would also comprise a dataset of unique potential event outcomes of set at least one sporting event in respect of which sports pool tickets can be sold. The potential event outcomes which have been associated with particular ticket records being sold, or the outcomes themselves having been "sold" in respect of a ticket in the pool, are sold event outcomes. Potential event outcomes which have not yet been associated with ticket records or have not yet been "sold" are available potential event outcomes. The ticketing server would also include ticketing server software for administering the ticket database.

The method would also comprise providing a raffle sales system in communication with the ticketing server, to transact the sale of sports pool tickets to purchasers. The raffle sales system as will be outlined in further detail below could be a traditional bearer raffle ticketing hardware and software system or the like, or a website system through which the system could actually offer self-fulfillment or sale of tickets to individual purchasers without the need for a purchasing agent to facilitate those transactions.

Following provision of the ticketing server and related components along with the raffle sales system, sports pool tickets are sold in the raffle during a defined sales window. In respect of each sports pool ticket sold the steps involved in the sale of that ticket comprise using the raffle sales system and the ticketing server in conjunction to capture purchaser identity details corresponding to the purchaser of the ticket, associating at least one available event outcome in respect of the ticket being sold, and storing the sold ticket particulars of the sold ticket, being the purchaser identity details and the at least one associated potential event outcome to a ticket record in the ticket database along with a unique ticket identifier. A ticket record would be created in the ticket database in respect of each ticket sold. Also it will be understood that upon association of a particular available potential event outcome to a ticket record, that event outcome becomes a sold event outcome which is no longer available for association with another ticket record. Also, to keep the raffle configuration of this contest and comply with legislative requirements around these types of pools when offered in a mass format, the purchaser of a ticket would not be aware of the particulars of the associated potential event outcomes for their ticket until after the ticket purchase transaction is completed. For example if a purchaser purchased a ticket which effectively resulted in them "purchasing" one potential event outcome or potential event score for a pool on a single sporting event, the purchaser would not know what the score was that they received with their purchase until after the purchase was completed.

Following the closure of the defined sales window or for the sports pool raffle and the completion of the at least one sporting event, a winning ticket would be selected from tickets sold. The winning ticket would be sold by comparing the winning event outcome of the at least one sporting event to the potential event outcomes which were associated with the ticket records for sold sports pool tickets within the ticket database. In the simplest embodiment, where all of the outcomes were sold with respect to all the sporting events in a particular pool, there would likely be only one winning event outcome unless there were preset rules that provided for the selection of most simply be considered and treated as more than one sporting event, and matching the winning event outcome to the sold ticket which had the potential event outcome associated therewith that matched the winning event outcome the winning ticket could be identified.

One of the benefits of the system and method of the present invention is that in the circumstance where not all of the potential event outcomes were sold, or in another way, there remained available event outcomes at the conclusion of the defined sales window for the sports pool raffle, if the winning event outcome from the at least one sporting event matched an available event outcome that was left at the end of the defined sales window i.e. the winning event outcome had not been sold, it is specifically contemplated that a random draw will be made from the active ticket records in the ticket database corresponding to tickets that were sold in the raffle. This could either be done using a random number generator, or by the printing of paper counter foils with a link in a traditional context.

The ticketing server software within the ticketing server would be responsible for administering the ticket database, and potentially with managing communications via any type of a network interface with the raffle sales system. This software could be of varying degrees of complexity and approach, all of which will be understood to those skilled in the art of program design and client server software systems and all of which are contemplated within the scope hereof.

The methodology of the assignment of the available potential event outcomes to particular tickets can take a number of different approaches. It is firstly necessary to understand that in the system and method as contemplated, the number of potential event outcomes which could be associated with a particular ticket record sold in respect of a particular at least one sporting event could be one, or it could be more than one. Insofar as the number of potential event outcomes which could be associated with a ticket record could be one or could be more than one, it will also be understood that the number of potential event outcomes which could be associated with a particular ticket record or a ticket sold could be the same, or in certain cases might provide that the purchaser at the time of purchase of their ticket might select a variable number of potential event outcomes for purchase and a variable number of potential event outcomes could be associated with different ticket records stored within the ticket database. All of these different approaches to the sales methodology and the configuration of the ticket database on the back end to accomplish this will be understood to be within the scope of the present invention.

The ticket database might be prepopulated with ticket records for sports pool tickets in the raffle before the opening of the defined ticket sales window, by creating ticket records which corresponded to each potential event outcome, and then the sales of a sports pool ticket in the raffle would simply comprise within the sales window capturing purchase or identity details and assigning those captured purchase or identity details to a prepopulated ticket record in the ticket database. This type of an approach would work best where it was only desired to provide for the same number of potential event outcomes to be assigned to each ticket sold in the database and in the raffle, although other approaches might also be derived in which this type of a pre-population approach might be desirable.

Alternatively and in more flexible embodiments of the method of the present invention, available potential event outcomes could be associated with tickets being sold during the actual sales transaction process within the sales window, by selecting and associating the desired number of available potential event outcomes to a ticket record at the time of ticket sale. Both such approaches again will be understood to be within the scope of the overall method.

As outlined above, the raffle sales system component of the system which would be used for the actual fulfillment of sale transactions might be a raffle sales system such as is currently used in the sales of other types of raffles such as bearer raffles and the like. These types of raffle sales systems comprise at least one raffle sales unit, each of which comprises an operator interface, a ticketing network interface for communication with the ticketing server, and raffle sales software by which an operator can sell tickets. The raffle sales unit might also include a printer by which ticket receipts and other documents could be printed for distribution to purchasers or for other reasons within the fulfillment and sale of a particular ticket or operation of a raffle sale.

The alternative to the raffle sales system which comprises at least one raffle sales unit and the related hardware and software in a venue type configuration would be to use a raffle sales website system as the raffle sales system, by which a purchaser could directly purchase sports pool tickets in a raffle administered in accordance with the remainder of the method of the present invention. Where the raffle sales system comprised a website system, the web server components of the website itself might be integrated with the ticketing server, or might alternatively comprise a separate web server which was operatively connected to the ticketing server for the purpose of administration of the method. Again any obvious hardware combinations which will achieve the result desired and outlined herein will be understood and are contemplated within the scope hereof.

In the case of a website being used as the raffle sales system, or even in certain cases where raffle sales units or the like were used, rather than providing a printed receipt to a purchaser about their ticket, the method might also comprise transmitting a ticket receipt to an electronic device of the purchaser—by email, etc. for example.

As outlined above, the number of sporting events in respect of which a raffle could be sold is variable. The simplest embodiments of the method of the present invention might pertain to the sale of a raffle and the sports pool in respect of a single sporting event, or in other cases the matrix of potential event outcomes related to a plurality of sporting events. Where the number of sporting events is more than one, at least one of those sporting events might be a discrete sporting event, or in certain cases at least one sporting event of the plurality of sporting events might be an interval scoring point within a discrete sporting event. The flexibility of the method of the present invention will be understood to those skilled in the art of the design of sports pools and it will be understood that this type of methodology could be used by simply retooling the matrix of potential event outcomes for large numbers of sporting events. In addition to discrete scoring outcomes or interval scoring outcomes of particular sporting events, the potential event outcome matrix might additionally or alternatively include combination outcomes of multiple teams and multiple games—for example the development of a matrix that effectively replaced sports brackets or the like as are currently popular from the perspective of individual wagering, etc.

Using the method of the present invention at least one winning ticket would be selected based on comparison of the winning event outcome of the at least one sporting event to the associated sold event outcomes stored in respect of the ticket records and the ticket database. Basically, the winning event outcome would be mapped against the matrix of potential event outcomes in the system, and the ticket purchaser who had that potential event outcome, if there was one, associated with their ticket, is the winner. This type of approach to selecting a winning ticket is easiest where all the tickets are sold in a particular raffle, or tickets covering all the available potential event outcomes are sold during the raffle sales window. If for some reason not all of the available potential event outcomes are sold, that is to say there are some available potential event outcomes left at the closure of the raffle sales window, and if the actual potential event outcome corresponding to the winning event outcome was not sold that is to say that in the strictest context no winning ticket was sold, it is specifically contemplated that a random winner would be chosen from tickets which were sold in the raffle. The random winner would be chosen either using a random number generator or the printing of counter foils or the like. The random drawing of a winner in this case might be done in a way that each ticket purchaser had effectively a single entry in the random drawing, or in the case where some ticket purchasers purchased more potential event outcomes than others in respect of their tickets, the random drawing could also be configured in a way that each purchaser would have the number of entries in that random drawing corresponding to the number of potential event outcomes that they had purchased in the sports pool raffle.

As outlined above in addition to the fact that one or more sporting events could be covered in the development of an outcome matrix for a particular sports pool raffle administered in accordance with the remainder of the method, the number of potential event outcomes which could be associated with a single sports pool ticket could also vary.

Simple embodiments of the method might have a single event outcome assigned to each ticket, or for example in some other cases it might be preset that each ticket sold had three potential event outcomes or some number of potential event outcomes assigned thereto. All such modifications and alterations to the method are contemplated within the scope of the present invention.

It is specifically contemplated that in the context of the administration of a sports pool raffle in accordance with the remainder of the method of the present invention where it is desired to assign more than one potential event outcome to individual tickets sold, the data set of potential event outcomes could be subdivided into a plurality of subgroups, whereby the more than one potential event outcomes associated with the ticket when sold are selected from multiple subgroups. This allows for the provision of some comfort to the purchaser that they will have access to multiple different groupings of potential score combinations or other potential outcomes diminished for example in the case of wanting to provide two subgroups whereby the purchaser would receive in a two-team sporting event assignment to their ticket of one event outcome in which the home team would win by a higher score and one event outcome in which the visiting team would win by a higher score, or something along those lines. Combinations and options are endless.

As outlined above, the number of potential event outcomes which could be associated with each sports pool ticket could be the same, or could be different. In the case of a different number of sports event outcomes to be assigned potentially at least to sports pool tickets sold, the purchaser could be allowed to select the number of potential event outcomes for purchase in respect of their ticket at the time of sale and based upon that choice the correct number of available event outcomes could be assigned to the ticket record for the ticket sold. Another aspect of the present invention which mitigates risk for the presenter of the raffle is that the raffle prize in a raffle administered in accordance with the present invention could either be an advertised static amount of money or non-monetary prize, or in another circumstance the prize which was offered could be a money amount based upon a percentage of ticket sales recorded on the ticketing database. These are both flexible options for the scoping of a sports pool raffle to be administered in accordance with the remainder of the present invention and it is contemplated that people would find these different options attractive from the perspective of not only offering the best possible combinations and prizes but also in terms of mitigating risk to the presenter—for example if a very large pool was configured, risk of overexposure of the presenter of the pool to paying an excessively large payout to the winner would be to set the pool up on the basis that the winner would receive a percentage of the ticket sales.

The method could also have a draw number assigned to each potential event outcome whereby the draw number rather than the potential event outcome itself would be presented in respect of the sale of the ticket—the draw number would effectively act as a veneer over the particular sporting score combination or potential event outcome which it represented and would in some ways simplify the draw process.

In addition to the method of the present invention the invention also comprises a ticketing server for the conduct of an electronically facilitated sports pool raffle in the respect of at least one sporting event having a winning event outcome. The server comprises a ticket database, comprising a plurality of ticket records each corresponding to a sports pool ticket sold in the raffle and each ticket record including a unique ticket identifier, purchaser identity details and associated details of at least one potential event outcome of the at least one sporting event assigned to the ticket. In addition to the ticket database the server also comprises a data set of unique potential event outcomes of the at least one sporting event in respect of which the tickets can be sold, potential event outcomes which have been associated with ticket records becoming sold event outcomes and potential event outcomes which have not been associated with ticket records yet remaining as available potential event outcomes. The server would also comprise a ticketing network interface for communication with a raffle sales system, and ticketing server software for administering the ticket database and managing communications via the ticketing network interface.

The ticketing server can be used in the sale of sports pool tickets in a raffle conducted in accordance with the remainder of the method during a defined sales window by, in respect of each sports pool ticket sold, first a capturing purchase or identity details corresponding to the purchaser, associating at least one available event outcome in respect of the ticket being sold, and storing the sold ticket particulars of the sold ticket, being the purchaser identity details on the at least one associated potential event outcome to a ticket record in the ticket database along with a unique ticket identifier. Upon association of available potential event outcomes to a ticket record they become sold event outcomes and are no longer available for association with another ticket record, and the purchaser of a ticket is not aware of the particulars of the associated potential event outcomes for their ticket until after the ticket purchaser transaction is completed.

The ticketing server would also be used to facilitate the selection of a winning ticket in the raffle following the closure of the defined sales window or completion of the at least one sporting event by selecting at least one winning ticket record from the ticket records related to the sports pro raffle stored in the ticket database based upon the winning event outcome and associated potential event outcome stored in respect of each ticket sold.

Where all of the potential event outcomes were sold in respect to tickets in the ticket database during the defined sales window, the winning ticket can be identified simply by identifying the potential event outcome or outcomes which correspond to the identified winning event outcome or outcomes from the at least one sporting event. Where not all of the event outcomes were sold in the pool, and specifically the winning ticket was not sold, a random draw would be used to ensure that a winner was declared in the raffle.

The server could be used with a raffle sales system which comprised site-based hardware and software or traditional raffle sales units as are used in other contexts, which would communicate via network interface with the ticketing server and comprise an operator interface and raffle sales software. Alternatively the ticketing server could use a interface to a raffle sales website system as the raffle sales system to facilitate the sale of tickets to purchasers.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

FIG. 1 is a sample of a basic prior art sports pool outcome matrix, for demonstrative purposes;

FIG. 2 shows one embodiment of a matrix of possible event outcomes for use in a sports pool raffle in accordance with the present invention, in respect of the outcome of a single sporting match;

FIG. 3 shows an alternate embodiment of the matrix of FIG. 2 for use in a sports pool raffle in accordance with the present invention, with possible event outcomes subdivided into high and low subsets;

FIG. 4 shows an alternate embodiment of the matrix of FIG. 2 for use in a sports pool raffle in accordance with the present invention, with possible event outcomes subdivided into each team winning;

FIG. 5 shows an alternate embodiment of the matrix of FIG. 2 for use in a sports pool raffle in accordance with the present invention, with ties removed from possible event outcomes;

FIG. 6 shows another embodiment of outcomes matrices for use in a sports pool raffle in accordance with the present invention with possible scores subdivided into high/low subsets and each team winning;

DETAILED DESCRIPTION OF ILLUSTRATED EMBODIMENTS

Figure 7:
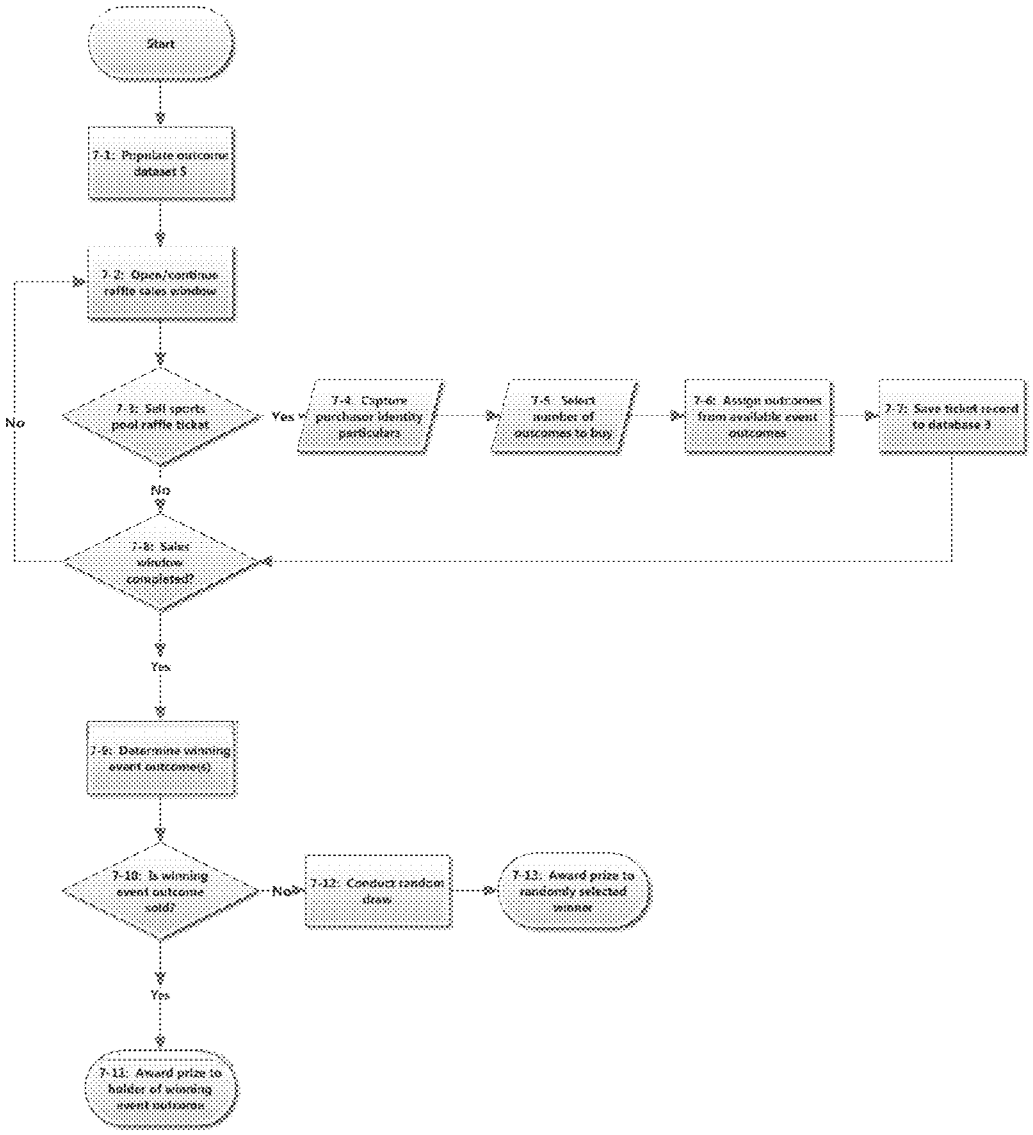
FIG. 7 is a flowchart demonstrating the basic steps in one embodiment of the sports pool raffle sales method of the present invention, in which available potential event outcomes are associated with ticket records at the time of ticket sale.

The invention is an improved method for holding a sports pool electronic raffle based on the final score of a single game or the final score on a series of games. Traditionally electronic raffles have been for 50/50 raffles or bearer ticket raffles. With the advent of the internet, online and electronic raffles allow mass participation from raffle ticket purchasers. Mass participation sports pools bring about their own risks. The invention guarantees a winner and reduces the risk for charities holding the raffle. It also mitigates the risk of players getting undesirable scores. Risk is mitigated for the charity by allowing multiple tickets sales and/or allowing for a percentage based jackpot system.

The invention, a system and method for conducting an electronically facilitated sports pool raffle in respect of at least one sporting event by selling sports pool tickets corresponding to potential outcomes of said at least one sporting event, allows for the electronic fulfillment and handling of a sports pool raffle which addresses shortcomings in prior art paper based methods and will allow for wider adoption and commercial success of this type of a raffle as a fundraising or commercial activity.

The following definitions provide further detail of some of the terminology used in this technical field which is useful for the purpose of understanding the invention disclosure and the subject matter in the area.

“Raffle”: A form of lottery in which a number of persons buy one or more chances to win a prize. Personal contact information needs to be taken. There is a definite winner.

“Bearer Ticket Raffle”: a form of lottery in which a number of persons buy one or more chances to win a prize. Personal contact information does not need to be taken as they are generally event based. There is a definite winner.

“Lottery”: a drawing of lots in which prizes are distributed to the winners among persons buying a chance. They are generally state or government run. Personal contact information is not taken; ie they use bearer tickets but it is not a bearer raffle. If there is more than one winner, the prize is shared. If there is no winner, the prize/jackpot accumulates.

“Sports Pool”: a raffle lottery based on the results of an individual game or series of sporting events. Ticket purchasers may not choose their own scores or results, but must instead purchase a ticket that has pre-set results stated on it. There is no skill involved in participation, and the winner is determined by chance when holding the ticket matching the outcome of the game or series.

“Sports Pool ticket”: a printed receipt sold in a sports pool raffle, representing a chance to win a prize. The ticket contains unknown scores or results of a sporting game or series of games, until after purchase of the ticket. The draw numbers may be the possible scores or they may be numbered, with the sports score more or less being a veneer for the purchaser, and the real ticket numbers being the more formal winning ticket number.

“Electronic Raffle System”: computer software and related equipment used by raffle licensees or charitable organisations to sell tickets, account for sales, and facilitates the drawing of tickets to determine the winners.

“Raffle Sales Unit”: is defined as a portable and/or wireless device, a remote hard wired connected device or standalone cashier station that is used as a point of sale for raffle tickets—also referred to as an RSU.

“Counterfoil”: an electronic record or paper ticket stub, also known as a barrel ticket, which will be drawn to determine a winner and contains a player’s draw number matching the bearer ticket purchased and may, depending on the type of raffle, contain the name, address, or telephone number of the player.

Prior Art—Bearer Raffles:

An electronic sports pool raffle is fundamentally similar to a bearer raffle. In a bearer raffle, using an electronic ticket sales system, a player would desire to purchase one or more tickets in the raffle each having several options on the pricing of tickets and number of drawn numbers. This style of ticket is often known as a discount ticket. The ticket numbers or identifiers in respect of these tickets might be sequential or random but are uniquely generated. A ticketing machine which is operatively connected to a server hosting a ticket database and system software is used in this method to sell tickets to the purchaser.

The ticketing machine has an operator interface by which tickets can be sold. Typically what would happen in this sale step would be that the operator of the ticketing machine would use the operator interface to enter the selected parameters for the ticket sale desired by the purchaser—for example the number of tickets to be purchased, or in certain cases selecting pricing options, number of drawn numbers etc. Based on input from the operator, the ticketing machine would generate the tickets for sale and would print out a ticket slip with the details of the tickets sold. The operator would then take the money in respect of those tickets from the purchaser and the purchaser would retain the ticket slip for the purpose of subsequently claiming their prize.

As outlined above each "ticket" which was sold would comprise a unique identifier in respect of the ticket. This could be a serial identifier or could be randomly generated as outlined above, and could be generated by the server and communicated to the ticketing machine at the time of the generation of the sale or the software on the ticketing machine might also be responsible for the generation or selection of the unique validation identifiers in respect of each ticket sold. The validation identifiers in respect of each sold ticket would be stored to the memory of the ticket machine and eventually uploaded to the ticket database on the server. In addition to the unique validation identifiers in respect of each ticket, the ticket machine would also store the other details of each ticket sold—for example the price, selected drawn number parameters etc.—so that all of those could be stored back to the central ticket database in respect of each ticket sold.

Following the purchase of a ticket from the operator of a ticket machine, the ticket machine would upload the details of that ticket sale to the central ticket database. Many electronic bearer ticket systems which currently exist also provide periodic updates either to the operators of the bearer raffle, or even to spectators within the venue by way of electronic displays or the like, of the current value of the proceeds to be one in the raffle etc.

Either during the open sales window for the sales of tickets in the bearer raffle, or at the close of the sales window, a counterfoil would be printed in respect of each ticket which had been sold. These counterfoils would be printed for placement into a draw drum so that a traditional manual drawing of a winning ticket number could be conducted. Alternatively, if it was desired to electronically select the winner of the bearer raffle without the printing of counterfoils, a random number generator could also be used to produce the winning ticket number or validation identifier, based on the details of validly sold tickets stored within the central ticket database. In some raffles more than one winning ticket would be chosen and this would require the selection of more than one winning counterfoil. Following the drawing of the winning ticket, the winning ticket number would traditionally be published or announced.

Prior Art and Game Theory:

There are a number of different iterations of sports pools, on one or more sporting events, which can be executed in accordance with the present invention.

In basic paper based sports pools, a matrix of possible outcomes is created. This is typically done by using a grid of equal size on both axes—one team is labelled at the top of the boxes and the other team going vertically down the left-hand side of the grid. This is so potential players know which team will correspond to each number that will be drawn. Bettors fill in each of the squares and money is collected for each square. The next step is to draw numbers for each row of squares—each square has two corresponding numbers. FIG. 1 shows a sample pool matrix which might have been created in a prior art paper based approach for a single two team game going to a maximum score of nine points per team. Once the game is over, the operators of the pool simply would consult the board and see who has the corresponding square and give them their prize or winnings.

In the Figure of FIG. 1, Paul has the square that corresponds with Team A scoring 6 points and Team B scoring two points. In football pools, just the last number of a team's score is used to determine the winning square. For example, Paul would also win the pool if Team B happened to defeat Team A by a score of 12-6 or 42-26, etc.

Preferred Single Game Embodiment:

A reasonable range of scores must be determined for ticketing purposes for a sporting event such as a football game. For illustrative purposes we will choose from 0-69 points. This means that either football team will score between 0 and 69 points. The number of possible individual team scores chosen should be an even number to allow an even number of possible two team combinations. In the above example there are 70 possible individual team scores listed and therefore there are 4900 possible combinations of scores ranging from both teams scoring 0 and both teams scoring 69. Team A could score 25 points while Team B scores 2 points or Team A scores 3 points and Team B scores 55 points. In the case where Team A scored 25 points and Team B scored 2 points the winner holding the raffle ticket Team A 25-Team B 2 would be the winner. The winning ticket is not known until the end of the game as it is dictated by the outcome of the match.

The reason to provide an even amount of possible combinations is because in this embodiment the sports pool raffle player receives two possible outcomes or scores on his raffle ticket. In order to ensure every possible combination can be sold if two combinations are given away with each ticket, there has to be an even amount of possible combinations. The total pool can be thought of as a matrix of 4900 squares, shown in FIG. 2. This is the dataset of potential event outcomes in respect of the sporting event.

If only one possible score was on a ticket and the person received either 0-0 or 69-69, they are likely not happy with their ticket as the odds are very unlikely that these will be the final scores. To alleviate this problem, two possible scores can be sold with the ticket. This helps mitigating a player not being happy with an undesirable score, if they have another score that is more likely to have a chance at winning.

To further avoid unhappiness of players, it is also possible to divide the dataset of potential event outcomes into a plurality of subsets of outcomes—for example as shown in FIG. 3, the 4900 pool of outcomes will be divided in half with high numbers and low. A player will receive a set of numbers from both subsets; a low number and a high number. Any number of different combinations or gaming approaches such as this will be understood to be within the overall scope and method of the present invention and are all contemplated within the scope hereof.

If the raffle was giving away 3 score combinations with a ticket then a pool of 4900 does not work as three does not divide into 4900 evenly. The range of scores would have to be a multiple of three such as (0-68, or 0-71). Three subsets could be made; low, medium and high.

To further mitigate the unhappiness of the player, in the low subset of 2450 possible scores, if Team A has a higher score than Team B, then for their second score from the high subset the player can receive a higher score for Team B than Team A, as shown in FIG. 4.

Ties could be handled basically as wild cards. The player will receive either team winning in the opposite subset. In many sports a game cannot end in a tie. One can argue that since it is impossible to end in a tie, ties should not be part of the matrix. It is possible to remove all 70 tying scores so every score has a chance to win shown, as shown in FIG. 5. In this embodiment however we will include ties as we will also have a half time score prize.

If the raffle was awarding quarter time or half time score prizes then ties must remain in the 4900 combination matrix. For the purpose of understanding within the scope of the claims of the remainder of the invention disclosure herein, if it was possible or desired to award quarter time or half time score prizes then each of these quarter time or half time intervals might be treated as separate sporting events from the perspective of selecting winners based upon the apportionment of potential event outcomes. The matrix is divided into 4 subsections with a random score from one subsection leading to random selection from the opposite subsection shown in FIG. 8. A low score with Team A winning would be matched with a high score Team B winning.

Preferred Multi-Game Embodiment:

A second embodiment of the invention could be purchasing electronic or online raffle tickets for the final score of a game that doesn't lend itself to mass raffle participation as there are not enough combinations of the final score as they are low scoring games. The final score of the final series of a sporting event could be utilized. For example, consider betting on the final NHL series.

There are 30 teams in the NHL, the final series has 4 possible number of games and 21 possible scores if you consider the max score to be 6 goals.

| | |
|---|---|
| Chances of getting the right two teams in winner/loser order: | 1 in 870 |
| Chances of getting the right # of games: | 1 in 4 |
| Chances of getting the final score right: | 1 in 21 |
| Overall chance of getting winning ticket | 1 in 73,080 |

You could hold this as a flat fee for one ticket. A $10.00 ticket would mean $730,800 in sales if you sold all the tickets. This would probably allow a jackpot of about $360,000. There is less risk of players being upset with receiving highly unlikely scores, however there is risk if you do not sell all the tickets. Theoretically you could only sell 1 ticket and it could be the winner . . . so the charity would be out $359,990 ($360,000-$10.00). To mitigate this risk, the charity could associate a plurality of potential event outcomes with each ticket sold, like above, and make the jackpot smaller. In this embodiment three scores are given away with each ticket purchase. The jackpot can now be $100,000. Breakeven now becomes selling 10,000 tickets, rather than 36,000 tickets.

If the charity/non-profit is not comfortable taking a risk of this level, a prize of a percentage of collected sales could also be used. In this way if all the tickets are not sold, then the winner only receives a percentage of what has been sold and the charity is at no risk. This is very easy to calculate with electronic or online sales.

Choosing a Winner where Winning Event Outcome not Sold:

One thing that needs to be done and which is the novelty of the present invention is that the method of the present invention ensures the availability and selection of a winner in the raffle, if the winning event outcome was not sold.

The basic concept here is that if upon the closure of the raffle sales window in the completion of the at least one sporting event, when the winning event outcome is compared to the ticket records stored within the ticket database 3 in respect of the raffle, if the winning event outcome was left as an available event outcome versus being associated with the sold ticket is a sold event outcome there is then the possibility that in respect to at least one prize raffle there is not a winner. What would be done in this case would be that either by use of a random number generator on the ticketing server or in a traditional sense by the printing of counterfoils from which a manual draw could be made, a winner would be chosen from all of the purchasers of tickets, to ensure that every prize could be claimed. The random draw from sold tickets where a winning event outcome had not been sold in the raffle could be made based on a draw that held one entry for each ticket purchaser, or one entry for each sold event outcome purchased by ticket purchasers. Both such approaches are contemplated within the scope of the present invention.

Prizing:

The prize for this sort of sports pool could be static such as $10,000 for the winner and $1,000 for a quarter-time or half-time score. The risk in this type of prize structure is if all the tickets are not sold and there is a winner. Theoretically only one ticket could sell and it could be the winner however unlikely it is a possibility. If the charity/non-profit is not comfortable taking the risk of this kind of prize structure a percentage of collected sales could also be used. In this way if all the tickets are not sold, then the winner only receives a percentage of what has been sold and the charity is at no risk. This is very easy to calculate with electronic or online sales.

Figure 8:
FIG. 8 is a flowchart demonstrating an alternate embodiment of the sports pool raffle sales method of the present invention, in which the ticket database is prepopulated with ticket records.

Method Overview:

FIGS. 7 and 8 are flowcharts demonstrating the steps involved in two different embodiments of the method of the present invention. Beginning first with FIG. 7 there is shown a flowchart of the first embodiment of the method in accordance with the present invention in which a plurality or variable number of potential event outcomes will be assigned to a ticket when sold, and the potential event outcome to be assigned to the ticket record in the ticket database as the tickets sold versus pre-populated which we demonstrated next in accordance with FIG. 8.

The first step which is shown, at 7-1, is at the commencement of the particular sports pool raffle to be administered in accordance with the system and method of the present invention the population of the dataset of potential event outcomes. The dataset is a subset of information which would either be located within the ticket database 3 or otherwise accessible to the server 2. This dataset 5 would contain each of the potential event outcomes which it was desired to be available for association or sale in association with the ticket in accordance with the sports raffle herein. The establishment of any other necessary parameters for the administration of the sports raffle in accordance herewith would also be done at this step.

As outlined in the claims of the remainder of the document herein, tickets for sports pool raffle are typically sold within a defined sales window and a venue or otherwise. Following the completion of the population of the outcome dataset 5, the opening of the raffle sales window is shown at step 7-2. The defined raffle sales window is the period of time within which raffle tickets for the sports pool raffle in accordance with the invention can be sold. The raffle sales window is shown is a loop in this figure, will be paying steps 7-2 and 7-8.

During the ticket sales window, sports pool tickets will be sold to purchasers. Tickets will be sold to purchasers using the raffle sales system—which as outlined elsewhere herein might either be a raffle sales unit or a raffle sales website. Ticket sales transactions would be initiated or completed within the ticket sales window.

If during the open sales window it is desired to sell a pool raffle ticket, shown at decision block 7-3, the steps of the sale of a raffle ticket in the sports pool of the present invention are shown on the "yes" leg of that decision block. First, shown at step 7-4, is the capture of purchaser identity particulars 42 with respect to the purchaser who wishes to purchase the ticket in question. Purchaser identity particulars 42 would be captured on the raffle sales system in conjunction with the ticket server.

This particular embodiment of the method is one in which it is contemplated that the purchaser would be allowed to specify a variable number of potential event outcomes in respect of which they wish to purchase. This might either be an ability to select a variable number of potential event outcomes, in respect of which one the selection was made an assignment or association would be made from the dataset of available event outcomes, or rather than selecting singly, in the case of a raffle where the outcomes are being sold in multiples for example in multiples of two, three or some other number of potential event outcomes sold at the same time it may also be possible rather than specifying an individual multiple of potential event outcomes for purchase in association with the ticket record in question that the selection of a multiple might be the selection of a multiple of multiples, so to speak—for example if the potential event outcomes are being sold in pairs, it might be possible to select a number of pairs rather than a number of single potential event outcomes for purchase.

Following the selection of the number of potential event outcomes to buy, shown at step 7-5, the ticketing server 2 would assign available potential event outcomes from the available potential event outcomes subset which was at that time available to a ticket record in respect of the ticket being sold—this is shown at step 7-6. Finally, step 7-7 shows the saving of a ticket record to the database 3 which contained the necessary purchaser identity particulars 42 as well as the association of the desired number of available event outcomes from the dataset 5 which would then no longer be available event outcomes but would be sold event outcomes which were no longer available for association with another ticket being sold. It is specifically contemplated that the purchaser would not see the details of the potential event outcomes being associated with their ticket until after the purchase transaction was completed.

Following the capture of the ticket particulars, including the purchaser identity particulars and any other necessary details, the sole ticket particulars would be saved in the ticket record the ticket database, payment would be collected and potentially a receipt for the ticket which could include the ticket identifier or other information would be issued to the purchaser.

Following the saving of the ticket record to the database 3, shown at step 7-7, the sales transaction would be completed and the sales window listener or move could be continued, as shown at step 7-8. The loop in which sports pool raffle tickets in accordance with the remainder of the method would be available for sale would continue until the selected time for expiry of the raffle sales window should arise. When the sales window was completed, shown by the "yes" leg of the decision block shown at step 7-8, the winner of the sports pool raffle can be selected.

Following the completion of the sales window, shown at step 7-8 as well as the completion of the sporting events in question, the winning event outcome or outcomes can be determined—shown at step 7-9. This would typically consist of matching the actual outcome of the sporting event or events with the outcome dataset 5, to select the outcome or outcomes from the outcome dataset 5 which correspond to the actual outcomes of the sporting event or events—these would be the winning event outcomes. Following the selection of the winning event outcomes it is necessary to determine whether or not the winning event outcome was actually sold in the sports pool raffle—this is shown at step 7-10.

If the winning event outcome was sold and therefore is associated with a ticket record and ticket database and all three, the prize in respect of that particular event outcome can be awarded to the purchaser of that ticket by basically matching the winning event outcome against the associated ticket record to that outcome in the database 3. This is shown at step 7-2.

Alternatively if the winning event outcome was not sold—that is to say that the winning event outcome remained unsold in the dataset 5 at the closure of the sales window, a random draw would be conducted, shown at step 7-12, determine a winner. The random draw, shown at step 7-12 could be conducted conventionally by the use of printed paper counter foils, or could be done using a random number generator or the like in the software on the server 2. Following the conduct of the random draw shown at step 7-12, the prize in respect of the unsold winning event outcome will be awarded to the randomly selected winner—which is shown at step 7-13.

FIG. 8 is a flowchart showing an alternate embodiment of the overall method of the present invention. From a high-level method outlined in this Figure is similar to that shown in FIG. 7 with some modifications. There is for example similar to the last Figure shown at step 8-1 as a first step in the process the population of the outcome dataset 5 within the database 3, in which any available or desired potential event outcomes in respect of the at least one sporting event which was the subject of the sports raffle in question would be populated.

The next step shown in this Figure at step 8-2 was the pre-population of the ticket database 3 with ticket records 40. This is an alternate approach to the live allocation of potential event outcomes to ticket sales during the sales process. This would introduce some limitation as to the ability to sell variable numbers of potential event outcomes with respect to particular ticket or ticket record, although is another process which could be used in terms of a slightly different dataflow or manipulation of information to achieve the same result which would be to potentially offered for sale sports pool raffle tickets corresponding to a plurality of potential event outcomes.

The opening of the raffle sales window or the continuation thereof is shown at step 8-3. Shown at step 8104 is the decision block around the desire to sell a pool raffle ticket. In this particular case as shown, if it was desired to sell a sports pool raffle ticket, the purchaser identity particulars 42 would be captured at step 8-5. Those purchaser identity particulars 42 would be assigned to an unsold pre-populated ticket record 40 within the ticket database 3. The updated ticket record 40 would be saved to the ticket database 3, and the sales window could continue. Once the sales window was completed at step 8-8, the winning event outcome or outcomes would be determined, shown at step 8-9 and the awarding of prizes either to the holders of winning event outcomes in Association with their tickets, or the random drawing winners if the winning event outcome had not been sold are shown in step 8-10 through 8-13, and would be administered similar to that shown in the final steps of the method of FIG. 7. It will be understood that there are many other different types of methods which could undertake this same overall approach and all such methods are many modifications to these methods that do not depart from the general scope and intention hereof are contemplated within the scope of the present invention.

Figure 9:
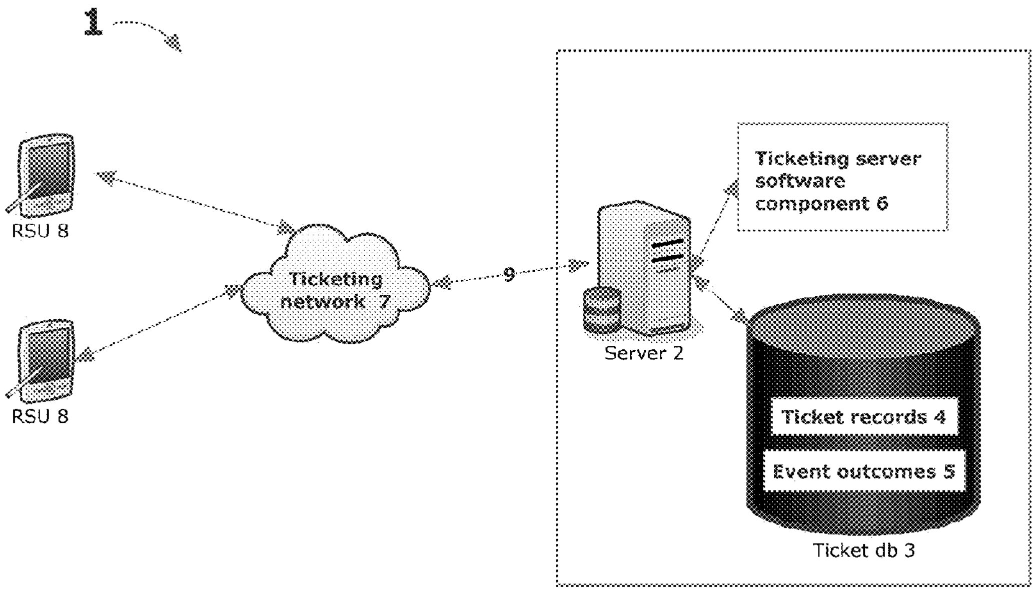
FIG. 9 is a block diagram of one embodiment of a system architecture in accordance with the present invention, in which the raffle sales system comprises a plurality of raffle sales units.

Illustrative Environment and System Architecture:

FIG. 9 shows an illustrative architecture of the overall system 1 of the present invention, in which ticket sales personnel can use raffle sales units 8, interacting with a ticketing server 2, to sell and issue sports pool raffle tickets to purchasers in accordance with the remainder of the present invention. The system embodiment shown in this Figure uses a plurality of raffle sales units 8 for the raffle sales system. As outlined elsewhere below in another embodiment, the raffle sales system might comprise a website system through which tickets could be sold.

The ticketing server 2 might include various software applications to manage aspects of interaction between various components of the system 1, the server 2 or the raffle sales units 8. Software applications on the ticketing server 2 would include ticketing server software 6, responsible for the administration and handling of the method of the present invention. The server 2 would host a ticket database 3, which was accessible to the software applications thereon and which would comprise a plurality of ticket records 4 corresponding to sports pool tickets which were sold in accordance with the method of the present invention. The ticket database 3 is shown here for demonstrative purposes.

The raffle sales units 8 would be connected to the ticketing server 2 via a ticketing networking 12. The ticketing network 12 could be any type of a communications network capable of communication between the ticketing server 2 and the raffle sales units 8. It could be a wide area network, local area network or otherwise. The raffle sales units 8 might be statically connected so they had constantly open communications with the ticketing server 2, or some embodiments of the system and method of the present invention could have the raffle sales units with redundancy or purpose-built software allowing for periodic or intermittent communication sessions with the ticketing server 2. For example if the ticketing network 12 were wireless and it was desired to allow for the sales of tickets on an ongoing basis even when the wireless communication was not available to the raffle sales units 8, the system 1 could allow for periodic handshaking and communication between the raffle sales units 8 and the ticketing server 2 for the sake of transmitting sold ticket particulars and other information to the ticketing server 2 for the creation of the necessary ticket records 4 in the database 3 related to tickets which were sold since the last communication. The ticketing network 12 might be any combination of multiple different types of networks, such as cable networks, local area networks, personal area networks, wide area networks, the internet, wireless networks, ad hoc networks and mesh networks or the like.

The ticketing server 2 might house or otherwise connect to one or more data stores of various information which are required for the operation of the method of the present invention. Specifically, the embodiment demonstrated in FIG. 9 shows a ticket database 3 which was operatively connected and accessible thereto with any number of subsets of data files stored therein. Different types of data structures which will each accomplish the same overarching method of the present invention are possible.

The architecture which is shown in FIG. 9 shows that ticketing server 2 along with two raffle sales units 8. Also shown is the ticketing network 12. These components are shown purely for demonstrative purposes and it will be understood that many different types of network architectures or system components and setups could be developed which would still accomplish the method outlined herein and all are contemplated within the scope of the present invention.

Figure 13:
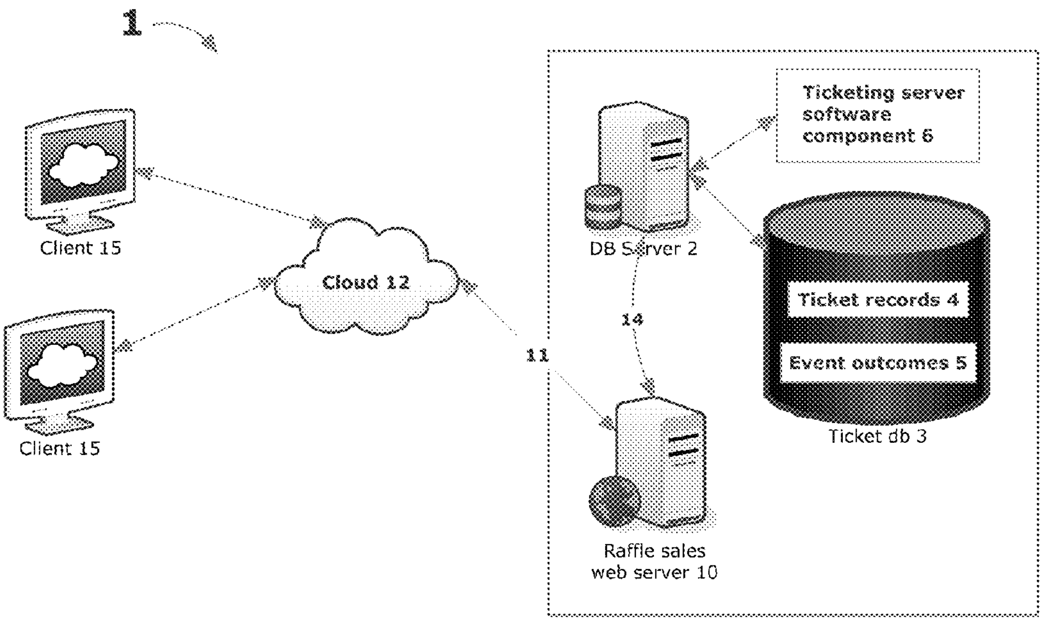
FIG. 13 is a block diagram of an alternate embodiment of a system architecture in accordance with the present invention, in which the raffle sales system comprises a website system.

FIG. 13 shows an alternate embodiment of the system of the present invention, in which the raffle sales system comprises a web site system rather than the plurality of raffle sales units 8. The raffle website system comprises a raffle sales Web server 10 operatively connected in such a way that it can interact with the ticketing server 2 and the ticket database 3 as well as with a plurality of client devices 15.

Ticketing Server:

The method of the present invention and the overall architecture would be client/server in nature and would rely upon a raffle sales system which was capable of communicating with the field.

Figure 10:
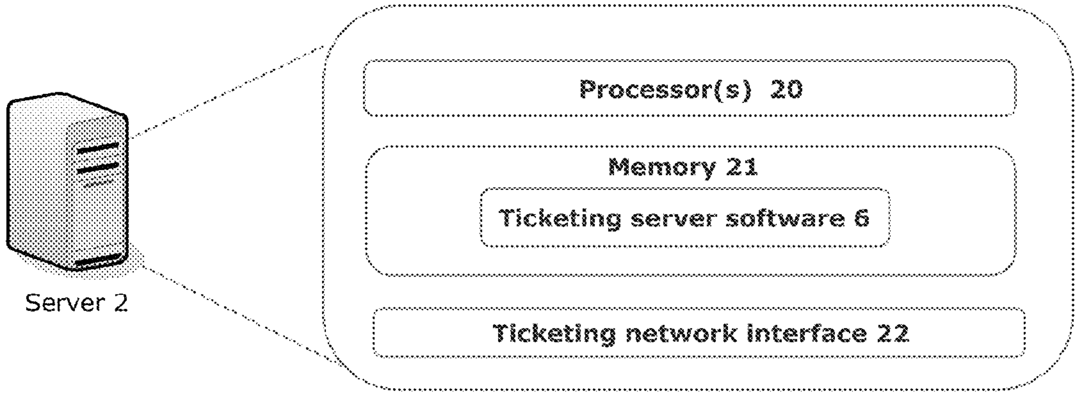
FIG. 10 is a schematic drawing of one embodiment of a ticketing server in accordance with the present invention.
Figure 11:
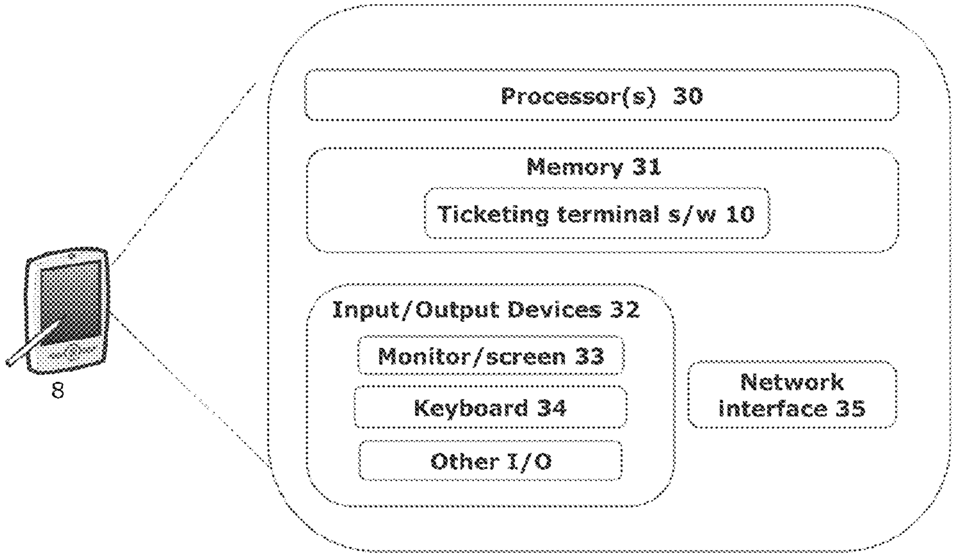
FIG. 11 is a schematic drawing of the key components of one embodiment of a raffle sales unit in accordance with the present invention.

FIG. 10 outlines an illustrative embodiment of a ticketing server 2 in accordance with the present invention. One or more ticketing servers 2 might be implemented in the method of the present invention—a single server or a server farm approach. The server or servers 2 would each compromise one or more processors 20 and memory 21. The memory 21 might contain various software components or a series of processor instructions for use in the method of the present invention or otherwise in the operation of the ticketing server 2. Processor instructions corresponding to the ticketing server software 6 are shown stored within the memory 21.

The server 2 hosts or is operatively connected to the ticket database 3. In addition to the necessary general operating system instructions and the like the ticketing server 2 would compromise a ticketing server software component 6 which would be responsible for execution of the method of the present invention at the server and, ticketing server software component 6 might itself act as the interface between the remainder of the hardware and software of the ticketing server 2 and the ticket database 3, or the ticketing server 2 might alternatively include additional software interface to the ticket database 3 with which the ticketing server software component 6 and its various subroutines could communicate.

The ticketing server software component 6 would compromise subroutines for the purpose of administering the ticket database 3, creating and modifying ticket database transactions and ticket records in interaction with the raffle sales units 8, as well as executing searches and reporting against the ticket database 3 as might be required. The details of the operation of the ticketing server software 6 are outlined herein.

Also shown on this Figure is the ticket network interface 22. The ticket network interface 22 would be the necessary hardware and software components resident on or installed upon the ticketing server 2 which would allow the ticketing server 2 to communicate with the raffle sales units 8 as well as any other components in the issuance of tickets. The ticket network interface 22 could again be by any wired or wireless interface using a network protocol allowing the ticketing server 2 to communicate with the ticketing devices 9 over a wide or local area.

Ticket Database:

A key aspect of the method of the present invention is the presence of a central ticket database 3 in which ticket records 4 which pertain to individual sports pool tickets sold in accordance with the remainder of the present invention will be stored. Sold ticket particulars would be stored in respect of each ticket that was sold and would include a unique ticket identifier 41, which could be a serial number or some other unique identifier in respect of the ticket for the purpose of keying the database, as well as purchaser identity particulars 42. As outlined elsewhere herein the purchaser identity particulars 42 could be a standalone communications address or identifier by which notification of status of outcome of a particular sports pool raffle in accordance with the method of the present invention could be messaged or communicated to the purchaser of a winning ticket, or to the purchaser of any ticket in the raffle, who in the prior art methods would have needed to present the physical ticket stub for collection of a prize since the sales process was otherwise anonymous. It should be noted the sports pool raffle could also be a long term raffle where name, address and phone number of the purchaser would be required to be taken and communicated to the server.

In addition to a ticket identifier 41 and a purchaser identity particulars 42, a completed ticket record in the ticket database 3 would also include the necessary information for the association of at least one potential event outcome from the event outcome data set 5 therewith. Each potential event outcome in the event outcome dataset 5 would only be permitted to be associated with an individual ticket record and ticket which was sold and it would then be effectively locked out of resale. There might also be other information stored within the ticket record—for example purchase price, or other parameters and information—the other information 44 is also shown in the ticket record subset of the database 3 shown in this Figure.

In addition to the plurality of ticket records 4 shown within the database 3, is also shown in the particular embodiment of the database 3 that is shown in this Figure the dataset of potential event outcomes 5. This could be stored within the database 3 or in some other accessible data structure but for the purposes of this particular Figure and discussion are shown herein. In respect of each potential event outcome 45 which is stored within that dataset 5 there is shown in this particular embodiment of that record in the database 3 and outcome identifier 43 which could be used for the association of the particular outcome 45 with a particular ticket record 40. The details of the particular potential event outcome 45 would also be stored as the outcome particulars 46. Finally in certain embodiments of the invention where it was desired to assign a ticket number or a drawn number to each potential event outcome 45, that veneer or draw number 47 might also be stored in the record.

The ticket database 3 might be resident on the ticketing server 2, or might alternatively be resident on or administered remotely within some type of server from a database environment which was operatively connected for communication with the ticketing server 2 of the remainder of the present invention. The database 3 might also compromise multiple databases or files rather than a single database file or structure.

The particular construction or data structure of the ticket database 3 might also depend on the infrastructure design of the remainder of the system of the present invention—again the various aspects of the system, its structure and the ticket database 3 including those which are infrastructure dependent—will be understood to those skilled in the art of relational database and client server system design and are all contemplated within the scope of the present invention. It is specifically contemplated that the ticket database 3 would most likely comprise a SQL database running on the necessary database server platform, however other approaches of tools and development environments could also be used.

Purchaser Identity Particulars:

One of the key aspects of the sale of tickets and the sports pool is that it is necessary for the vendor of the sports pool to understand who the purchaser of the tickets actually were. As such it is specifically contemplated that each ticket record 4 in the ticket database 3 will include purchaser identity particulars 42, such as the name, address, email address or some other contact coordinates for a purchaser so that they could be reached to be advised of their participation as a winner in a particular iteration of the sports raffle in question. Many different types of purchaser identity particulars 42 could be contemplated. As well, the types of purchaser identity particulars 42 which might be captured might be altered based upon the type of raffle sales system which was going to be used. For example if the raffle sales system is a website, it will be reasonably easy to provide a fulsome data entry function where any type of purchaser identity particulars 42 could be gathered from a purchaser or seller of the ticket, and even validated. In the case of raffle sales units 8 being used as the raffle sales system as outlined otherwise herein, it may be desired based upon the nature of the user interface of those devices to provide for something more basic in terms of the ability to capture the user or purchaser identity particulars 42. For example a purchaser at any particulars 42 which might be captured in respect of a particular ticket sale might even be a photograph or scanned image of the identification of a purchaser or the like which could simply be used by the vendor of the raffle to capture or generate the necessary information to advise the winner of a particular raffle of their status and participation in same. Really the limitless approaches which could be taken to purchaser identity particulars 42 will be understood by those skilled in the art of systems design such as the system outlined herein and any approach which results in the capture of any purchaser identity particulars 42 which could be captured and stored to the ticket database 3 are contemplated within the scope of the present invention.

Sold Ticket Particulars:

To implement the method of the present invention, the ticket database 3 would need to comprise or include in each ticket record 8 pertaining to a sports pool ticket sold in respect of a raffle, the necessary information to allow for the inclusion of that sports pool ticket purchased in the raffle as well as tracking the purchaser information of the purchaser which is captured at the time of sale of that sports pool ticket. The ticket database 3 would comprise of a plurality of ticket records 4, each of which ticket record 8 corresponded to a sports pool ticket which had been sold.

Figure 12:
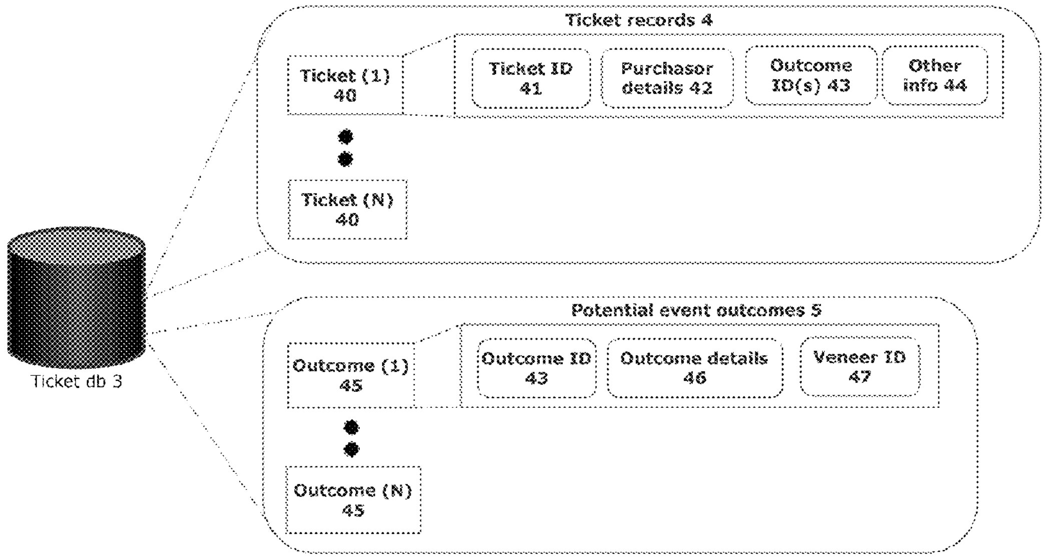
FIG. 12 is a schematic diagram of one embodiment of a ticket database in accordance with the present invention.

Referring to FIG. 12, there are showing some additional information to further outline the intended data structure or layout of the ticket database 3 in one embodiment at least, with respect to the ticket database set and the plurality of ticket records 4 stored therein. Each ticket record 8 would represent a single sports pool ticket which had been sold in a raffle in accordance with the remainder of the present invention. As can be seen with respect to the first ticket record 8 outlined in the Figure there are a number of key tokens in the ticket record 8. The first item contained within that ticket record 8 is a unique ticket identifier 41. As outlined above and elsewhere this would be a serial key identifying the particular ticket for tracking within the database 3 and in accordance with the remainder of the present invention. The software components of the server 2 as well as the raffle sales units 8 would generate and/or assign these unique serial keys to each sports pool ticket at the time of sale such that they could be stored within the ticket database.

In certain cases, the ticket identifier 41 could be a field on the record 8 which had multiple purposes and represented other information as well.

In addition to the unique ticket identifier 41 which would be captured or generated in respect of each ticket record 8, at the time that a set of sold ticket particulars was received in transmission from a raffle sales units 8 to the ticketing server 2, the ticket record 8 would also include a purchaser identifier 3. The purchaser identifier 3 would be captured at the raffle sales units 8 and would identify the purchaser of the ticket. As outlined in greater detail elsewhere herein, the purchaser identifier 3 is contemplated to either be some type of a communications address which could be used to directly to communicate to the purchaser if there were questions in respect of the ticket sold in sports pool raffle or if it was desired to contact the purchaser to announce a raffle win, etc. The purchaser identifier 3 in this case could be an email address, a cell phone number capable of receiving SMS text messages or even a telephone number of a landline which could be used to contact the purchaser in a traditional fashion.

The purchaser identifier 3 could also be a link to a purchaser record and a purchaser database which will be outlined in further detail below.

Ticket parameters 2 would also be stored in the ticket record 8 which would include other parameters or details of the sports pool ticket which had been sold—for example the price at which the ticket was sold, team scores, numbers or applicable gaming parameters where there were variable rules in the raffle, whether or not certain optional or progressive or side bets were placed if they were available within the raffle, etc. Any necessary data tokens of fields which were necessary to calculate and/or operate such a sports pool ticket raffle will be understood by those skilled in the art of game design and are contemplated within the scope of the present invention.

Ticketing Server Software:

The ticketing server software component 6 in the software resident on or accessible to the server 2 would be key to the performance of the present method. It is specifically contemplated that the functions of the ticketing server software component 6 would include creation and administration of ticket records 4 within the ticket database 3, interaction with the raffle sales units 8 or the raffle sales website for the purpose of gathering information from the purchasers or operators and from those devices 8 for the creation or updating of ticket records 4 within the database 3, as well as other query or reporting functions. Each of the software functions or modules could be freestanding software applications or subroutines within the memory or storage of the server 2 or alternatively they could each be functions of a consolidated software program—both such approaches are contemplated within the scope of the present invention.

Overall the creation and administration of ticket records 4 within the ticket database 3 will be conducted by a database administration module. The database administration module would be responsible for the administration of records in various data subsets stored within the database 3. Upon receipt of a transmission from the raffle sales system of sold ticket particulars with respect to one or more tickets which have been sold, the database administration module would parse that transmission or information into the necessary details required to create ticket records 4 within the ticket database 3 corresponding to each ticket which had been sold.

The ticketing server software component 6 might also include a random number generator or the other necessary software instructions to enable the selection of winning tickets from ticket records in the ticket database where random selection was required (the winning event outcome not being sold). Alternatively if manual draw was the preferred approach with respect to a particular implementation of the software and method of the present invention, the ticketing server might be operatively connected to a counterfoil printer and the software server component 6 might include the necessary additional query and reporting components to allow for the printing of counterfoils corresponding to active tickets and active ticket records within the database 3 for the purpose of the conduct of the manual draw where required.

Raffle Sales System:

As outlined herein, ticketing server 2 would be in operative communication with the raffle sales system to facilitate the sale of sports pool raffle tickets in accordance with the remainder of the method of the present invention. The raffle sales system is specifically contemplated to take one of two configurations, the first of which would be that the raffle sales system comprises a plurality of raffle sales units and related hardware and software, as is used in other site based raffle sales to sell bearer raffles and the like. Alternatively the raffle sales system might be a website system which is used to facilitate the sale of sports pool raffle tickets in accordance with the remainder of the method—whereby either a vendor representative seeking to sell a sports pool raffle ticket, or even in a self-fulfillment approach that the customer themselves want to go on the website and simply purchase one or more sports pool tickets in accordance with the remainder of the method, they can access the website using a client browser and effect the necessary interaction with the remainder of the raffle sales website as well as the ticketing server and the ticket database to finalize the purchase of tickets in accordance with the remainder of the method. It will also be understood that a third approach could be to provide a hybrid sales strategy and infrastructure, wherein the ticketing server 2 was capable of communication with either or both of a plurality of raffle sales unit hardware and a website so that both types of sales could be accomplished in accordance with the remainder of the method for the sales of tickets in a sports pool raffle being administered otherwise generally in accordance with the present invention.

Raffle Sales Unit:

As outlined above, one embodiment of the raffle sales system contemplated by the present invention is a series of at least one raffle sales units 8. These would typically be raffle sales hardware that would otherwise be used for the sale of other types of raffle tickets which could be reprogrammed with modified software to allow for practice of the method of the present invention. The system demonstrated in FIG. 9 shows a plurality of raffle sales units 8, and FIG. 2 is a schematic diagram showing a basic block configuration of one raffle sales unit 8 in accordance with the present invention. Many different types of hardware and software could be used in this type of an approach and all will be considered to be within the scope of the present invention—even the configuration of a smart phone, tablet or other device as a raffle sales unit 8, by the incorporation of appropriate software or components therein, is contemplated within the scope of the present invention.

Referring to FIG. 2. Pre-existing raffle sales unit 8 hardware could be repurposed with modified software for use in accordance with the remainder of this system and method of the present invention or purpose built hardware could also be used. The raffle sales unit 8 includes one or more processors 30 and a memory 31. Similar to computer memory on the ticketing server 2, the memory on the raffle sales unit 8 might include various types of processor instructions either for assistance in the execution of the method of the present invention or for other activities to be undertaken with the raffle sales unit 8. The memory 31 would include a raffle sales software component 10 which is installed for the purpose of communicating with the ticketing server 2, and accomplishing the remainder of the method by providing the operator interface and enabling the operator of the raffle sales unit 8 to interact with the purchaser and to issue sports pool tickets in accordance with the remainder of this system and method of the present invention.

The raffle sales unit 8 which is shown in this Figure also includes one or more input and output devices 32. This particular Figure shows the present of a screen 33, some type of a keyboard or other data entry means 34 by which the operator of the device 9 could interact with and enter information for capture. In some implementations, the raffle sales unit 8 might also include a clock, location sensor or the like. Also present in the raffle sales unit 8 would be a ticket network interface 35 by which the raffle sales unit 8 could communicate with the ticketing server 2 for the purpose of the transmission of sold ticket particulars related to sports pool ticket sales transactions completed on that raffle sales unit to the ticketing server 2, for the purpose of creation of ticket records 4 within the ticket database 3 with respect to tickets being sold by that raffle sales unit 8.

The ticket network interface 35 might use any type of network communication protocol depending upon the network infrastructure in question. In some implementations, the ticket network interface 35 might be intended to send and receive data from the network wirelessly, and in other cases a wired network connection might be used. Some deployments of ticket network 12 in accordance with the remainder of the present invention could foreseeably include both hard wired as well as wireless raffle sales units 8.

Insofar as the method of the present invention is built around the ability to remotely sell sports pool tickets in a sports pool raffle within a network environment, the raffle sales units 8 would need to include a raffle sales software program 10 which was capable of interacting with the remainder of the system of the present invention. The basic requirements of the raffle sales software 10 would be the need to interact with the software and hardware components resident on or connected to the raffle sales unit 8 at the appropriate time to read or capture purchaser identity particulars and other information from the operator in respect of a sports pool ticket or tickets being sold, and to provide for the ability to transmit sold ticket particulars in respect of sports pool ticket sales transactions back to the ticketing server 2. The raffle sales unit 8 and the software component 10 would also work in conjunction with the software on the ticketing server 2 to assign or allocate available event outcomes in respect of tickets being sold and otherwise gather or assign the necessary information for the creation ticket records 4 within the ticket database 2.

It is primarily contemplated that the raffle sales software 10 would be a freestanding local application on the raffle sales unit 8—by creating a freestanding local application for use on the raffle sales unit 8 there would be numerous benefits including the fact that the raffle sales unit 8 would then not need to have constant network connectivity to the ticketing network 12 since it could store an offline subset of captured and generated sold ticket particulars for periodic upload when the network connection was available to the server 2 and the ticket database 3.

As outlined above it is specifically contemplated that the method of the present invention could be practiced using pre-existing raffle sales units 8 by the provision of a modified software component 10 for installation and operation thereon. Both the retrofit of existing raffle sales unit 8 hardware as well as custom-built or purpose built new raffle sales unit hardware 8 are contemplated within the scope hereof.

Raffle Sales Website:

The second type of raffle sales system which is contemplated for use in accordance with the remainder of the method of the present invention, in place of or alongside the raffle sales units 8 outlined above, is the implementation of a raffle sales website system, whereby a website would be provided by which either a ticket seller or an individual purchaser wishing to facilitate or transact a sale of one or more sports pool tickets in accordance with the remainder of the method of the present invention could do so via a website. Referring to FIG. 13, there is shown a raffle sales website system, which comprises a raffle sales Web server 10 which was operatively connected to the ticketing server 2 and the ticketing database 3 for the purpose of transacting ticket sales transactions. Ticket purchasers or ticket sellers would be able to access the ticketing Web server 10 via the client/server connection on the cloud 12 to the raffle sales Web server 10 from their client devices 15—the client device 15 could really be any device with a web browser installed thereon which was capable of communicating with the server 10.

The server 10 would contain the necessary content, hardware, software and processor instructions to interact with both the client devices 15 as well as the components of the ticketing server 2, for the purpose of facilitating ticket sales transactions. The server 10 could be freestanding server hardware, or in some embodiments could actually constitute an additional software components installed on the same physical server as the ticketing server 2. Both such approaches are contemplated within the scope of the present invention. In the case of a freestanding retail raffle sales server 10, the raffle sales server 10 could be co-located at the same data centre location as the ticketing server 2 or could actually be remotely connected to the ticketing server 2 by a VPN, local area or wide-area network connection and again all such approaches are contemplated within the scope hereof. The development of the necessary software components for installation and execution on a Web server 10 which would allow for the transaction of ticket sales transactions in accordance with the remainder of the method of the present invention with the raffle sales server 10 comprising the raffle sales system outlined herein are all contemplated within the scope of the present invention.

Hybrid Raffle Sales System:

As outlined elsewhere above, it is also specifically contemplated that the raffle sales system that could be used in accordance with the remainder of the method and system of the present invention could be a hybrid system, including both the raffle sales website system as well as a plurality of raffle sales units. A hybrid system which would allow both for a self-service approach by which purchasers who wish to purchase one or more sports pool tickets in accordance with the remainder of the present invention could access a website by which to do so, as well as a system which would accommodate the use of one or more raffle sales units 8 for the purpose of sight based sales of sports pool tickets in accordance with the remainder of the method is specifically contemplated within the scope hereof. The necessary changes to the remaining infrastructure of the system and method of the present invention to accomplish or implement a hybrid sales system such as is described herein will be understood to be contemplated within the scope of the present invention will be understood by those skilled in the art of database, systems and software design.

Figure 14:
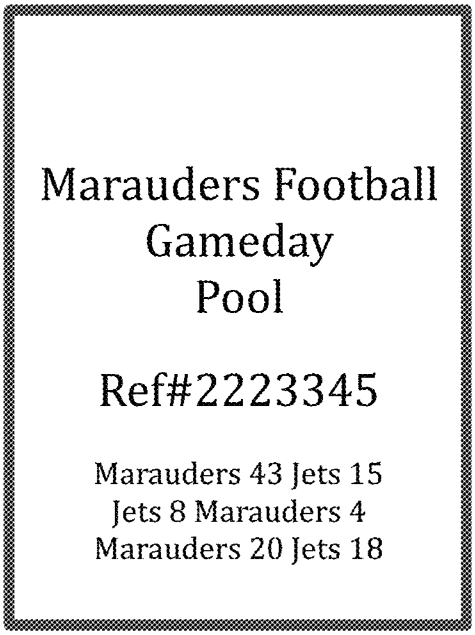
FIG. 14 shows a demonstrative sports pool ticket in accordance with the present invention, in which the associated potential event outcomes are printed and displayed as the draw number.
Figure 15:
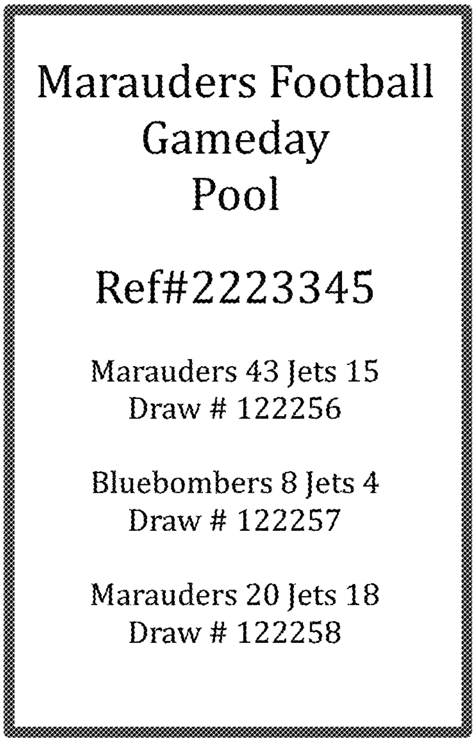
FIG. 15 shows a demonstrative sports pool ticket in accordance with present invention, in which draw number veneers have been assigned to the associated potential event outcomes.

Sold Tickets:

As outlined herein, it is likely that a purchaser of a sports pool ticket in accordance with the method of the present invention would be provided with a printed or electronically transmitted receipt for ticket which outlined the details of the ticket purchased. FIGS. 14 and 15 showed two examples of sample ticket stubs which might be provided to a purchaser of a ticket in accordance with the invention. In the ticket which is shown in FIG. 14, the purchaser has purchased three potential event outcomes in respect of their ticket and the potential event outcomes are listed. Those potential event outcomes would each be associated from the potential event outcome dataset 5 to the ticket record 40 corresponding to this ticket as well. Alternatively, in the case of an iteration of the method which assigned a drawn number or another type of a veneer to the particular event score of a particular potential event outcome, those additional veneers or draw numbers might also be printed on the ticket stub provided to the customer. FIG. 15 shows an alternate embodiment of a ticket stub in which the three potential event outcomes associated with the ticket sold are each associated with a draw number which is included on the ticket.

Thus, it is clear that the described embodiments provide an enhanced sports pool raffle system and method with commercial utility and market attractiveness. In addition, it will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

The invention claimed is:

1. A method of conducting an electronically facilitated sports pool raffle in respect of at least one sporting event having a winning event outcome, said method comprising:

a) providing a ticketing server comprising:

i. a ticket database comprising a plurality of ticket records each corresponding to a sports pool ticket sold in the raffle, each ticket record including a unique ticket identifier, purchasor identity details and associated details of at least one potential event outcome of said at least one sporting event assigned to the ticket;

ii. a dataset of unique potential event outcomes of said at least one sporting event in respect of which sports pool tickets can be sold, potential event outcomes which have been associated with ticket records being sold event outcomes and potential event outcomes which have not been associated with ticket records being available potential event outcomes;

iii. ticketing server software stored on a memory, for administering the ticket database;

b) providing a raffle sales system in communication with the ticketing server, to transact the sale of sports pool tickets to purchasors;

c) selling sports pool tickets in the raffle during a defined sales window by, in respect of each sports pool ticket sold:

i) using the raffle sales system and the ticketing server:

capturing purchasor identity details corresponding to the purchasor;

associating at least one available event outcome in respect of the ticket being sold;

storing the sold ticket particulars of the sold ticket, being the purchasor identity details and the at least one associated potential event outcome to a ticket record in the ticket database along with a unique ticket identifier;

wherein upon association of available potential event outcomes to a ticket record they become sold event outcomes and are no longer available for association with another ticket record;

and wherein the purchasor of a ticket is not aware of the particulars of the associated potential event outcomes for their ticket until after the ticket purchase transaction is completed;

d) following the closure of the defined sales window for the sports pool raffle and completion of the at least one sporting event, selecting a winning ticket from tickets sold by comparison of the winning event outcome of the at least one sporting event to the potential event outcomes associated with the ticket records for sold sports pool tickets within the ticket database.

2. The method of claim 1 wherein the ticket database is pre-populated with ticket records for sports pool tickets in the raffle before the opening of the defined ticket sales window by creating ticket records corresponding to each potential event outcome, and wherein sales of a sports pool ticket within the sales window comprises capturing purchasor identity details and assigning said captured purchasor identity details to a prepopulated ticket record in the ticket database.

3. The method of claim 1 wherein available potential event outcomes are associated with tickets being sold during sales of individual tickets within the sales window, by selection and association of the desired number of available potential event outcomes to the ticket record at the time of ticket sale.

4. The method of claim 1 wherein the raffle sales system comprises at least one raffle sales unit, comprising an operator interface, a ticketing network interface for communication with the ticketing server, and raffle sales software, by which an operator can sell tickets.

5. The method of claim 4 wherein the sale of a sports pool ticket further comprises the printing of a ticket receipt on the raffle sales unit for provision to the purchasor.

6. The method of claim 1 wherein the raffle sales system comprises a raffle sales web site system, by which a purchasor can purchase sports pool tickets.

7. The method of claim 6 wherein the server components of the web site system are integrated with the ticketing server.

8. The method of claim 6 wherein the web site system uses a separate web server from the ticketing server, operatively connected to the ticketing server.

9. The method of claim 1 wherein the sale of a sports pool ticket to a purchasor further comprises the transmission of a ticket receipt to an electronic device of the purchasor.

10. The method of claim 1 wherein the number of sporting events in respect of which a raffle is sold is one.

11. The method of claim 1 wherein the number of sporting events in respect of which a raffle is sold is more than one.

12. The method of claim 1 wherein at least one sporting event is a discrete sporting event.

13. The method of claim 1 wherein at least one sporting event is an interval scoring point within a discrete sporting event.

14. The method of claim 1 wherein the at least one winning ticket is selected based on comparison of the winning event outcome of the at least one sporting event to the associated potential event outcomes stored in respect of the ticket records.

15. The method of claim 14 wherein tickets are sold for all available potential event outcomes during the raffle sales window.

16. The method of claim 15 wherein the winning ticket is the ticket corresponding to the ticket record which has the sold event outcome that matches the winning event outcome associated therewith.

17. The method of claim 14 wherein tickets are not sold for all available potential event outcomes during the raffle sales window.

18. The method of claim 17 wherein if the potential event outcome which matches the winning event outcome in respect of the at least one sporting event remains an unsold available event outcome, the selection of a winning ticket comprises randomly selecting a winning ticket record from the ticket records in the ticket database corresponding to the raffle.

19. The method of claim 18 wherein the random selection of a winning ticket record is electronically accomplished using a random number generator on the ticketing server.

20. The method of claim 18 wherein the random selection of a winning ticket record comprises printing at least one counterfoil for each active ticket record in the ticket database in respect of the raffle, from which a physical draw can be made.

21. The method of claim 1 wherein the number of potential event outcomes which is associated with a single sports pool ticket sold is one.

22. The method of claim 1 wherein the number of potential event outcomes which is associated with a single sports pool ticket sold is more than one.

23. The method of claim 22 wherein the dataset of potential event outcomes in respect of which a raffle is sold is subdivided into a plurality of subgroups, and wherein the more than one potential event outcomes associated to the ticket are selected from multiple subgroups.

24. The method of claim 1 wherein the number of potential event outcomes associated with each sports pool ticket sold is the same.

25. The method of claim 1 wherein the number of potential event outcomes associated with each sports pool ticket sold can be different.

26. The method of claim 25 wherein the purchasor can select the number of potential event outcomes for purchase in respect of their ticket at the time of sale, and based on that choice the correct number of available event outcomes is assigned to the ticket record for the ticket sold.

27. The method of claim 1 wherein the raffle prize is an advertised static amount or prize.

28. The method of claim 1 wherein the prize is a money amount based on a percentage of ticket sales recorded on the ticketing database.

29. The method of claim 1 wherein each potential event outcome of the at least one sporting event in respect of a raffle is associated with a draw number such that the sports outcomes do not act as the draw number.

30. A ticketing server for the conduct of an electronically facilitated sports pool raffle in respect of at least one sporting event having a winning event outcome, said server comprising:

a) a ticket database comprising a plurality of ticket records each corresponding to a sports pool ticket sold in the raffle, each ticket record including a unique ticket identifier, purchasor identity details and associated details of at least one potential event outcome of said at least one sporting event assigned to the ticket;

b) a dataset of unique potential event outcomes of said at least one sporting event in respect of which sports pool tickets can be sold, potential event outcomes which have been associated with ticket records being sold event outcomes and potential event outcomes which have not been associated with ticket records being available potential event outcomes; and c) a ticketing network interface for communication with a raffle sales system; and d) ticketing server software stored on a memory, for administering the ticket database and managing communications via the ticketing network interface;

wherein said ticketing server can be used in the sale of sports pool tickets in the raffle during a defined sales window by, in respect of each sports pool ticket sold:

capturing purchasor identity details corresponding to the purchasor;

associating at least one available event outcome in respect of the ticket being sold;

storing the sold ticket particulars of the sold ticket, being the purchasor identity details and the at least one associated potential event outcome to a ticket record in the ticket database along with a unique ticket identifier;

wherein upon association of available potential event outcomes to a ticket record they become sold event outcomes and are no longer available for association with another ticket record;

and wherein the purchasor of a ticket is not aware of the particulars of the associated potential event outcomes for their ticket until after the ticket purchase transaction is completed;

and wherein the ticketing server will facilitate the selection of a winning ticket in the raffle following the closure of the defined sales window and completion of the at least one sporting event, by selecting at least one winning ticket record from the ticket records related to the sports pool raffle stored in the ticket database based on the winning event outcome and associated potential event outcomes stored in respect of each ticket sold.

31. The ticketing server of claim 30 wherein the raffle sales system comprises at least one raffle sales unit, comprising an operator interface, a network interface for communication with the ticketing server, and raffle sales software, by which an operator can sell tickets.

32. The ticketing server of claim 30 wherein the raffle sales system comprises a raffle sales web site system, by which a purchasor can purchase sports pool tickets.

* * * * *